United States Patent
Takata et al.

(10) Patent No.: US 12,438,612 B2
(45) Date of Patent: Oct. 7, 2025

(54) FREE-SPACE OPTICAL COMMUNICATION CONTROL SYSTEM, FREE-SPACE OPTICAL COMMUNICATION CONTROL APPARATUS, AND FREE-SPACE OPTICAL COMMUNICATION CONTROL METHOD

(71) Applicant: NEC Corporation, Tokyo (JP)

(72) Inventors: Koya Takata, Tokyo (JP); Atsushi Kamoi, Tokyo (JP); Hisashi Mizumoto, Tokyo (JP); Masaki Aizono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 274 days.

(21) Appl. No.: 18/226,051

(22) Filed: Jul. 25, 2023

(65) Prior Publication Data

US 2024/0106535 A1     Mar. 28, 2024

(30) Foreign Application Priority Data

Sep. 28, 2022 (JP) ................................ 2022-155305

(51) Int. Cl.
*H04B 10/11* (2013.01)
*H04B 10/29* (2013.01)

(52) U.S. Cl.
CPC ............. *H04B 10/11* (2013.01); *H04B 10/29* (2013.01)

(58) Field of Classification Search
None
See application file for complete search history.

(56) References Cited

U.S. PATENT DOCUMENTS

| | | | |
|---|---|---|---|
| 2012/0230701 A1 | 9/2012 | Murata et al. | |
| 2019/0319704 A1 | 10/2019 | Murthy et al. | |
| 2021/0075509 A1* | 3/2021 | Draaijer | H04B 10/118 |
| 2023/0254038 A1* | 8/2023 | Karri | H04B 10/116 |
| | | | 398/131 |

FOREIGN PATENT DOCUMENTS

| | | |
|---|---|---|
| JP | H05-031395 U | 4/1993 |
| JP | H11-068666 A | 3/1999 |
| JP | 2012-186662 A | 9/2012 |
| JP | 2020-503729 A | 1/2020 |

* cited by examiner

*Primary Examiner* — David W Lambert
(74) *Attorney, Agent, or Firm* — Sughrue Mion, PLLC

(57) ABSTRACT

A free-space optical communication control system includes at least one processor. The at least one processor carries out: a first detection process of detecting a change in a connection relationship between a first free-space optical communication apparatus and a second free-space optical communication apparatus adjacent to the first free-space optical communication apparatus; a second detection process of detecting a transition of work stages in accordance with the change in the connection relationship detected and plan information indicating a connection relationship between the first free-space optical communication apparatus and the second free-space optical communication apparatus in each of the work stages; and a connection control process of controlling, according to the transition of the work stages detected, which connection destination is connected to the first free-space optical communication apparatus.

18 Claims, 13 Drawing Sheets

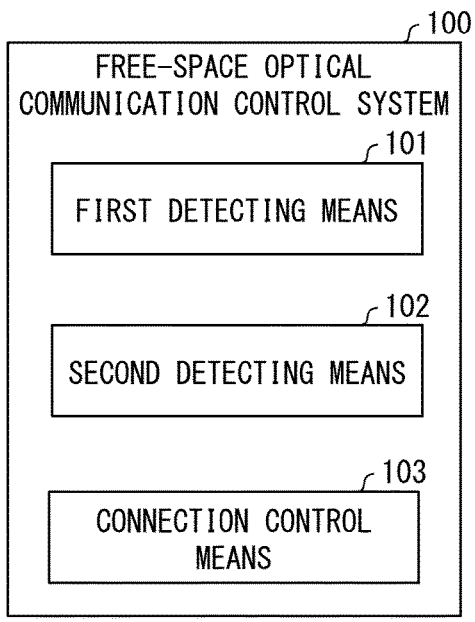
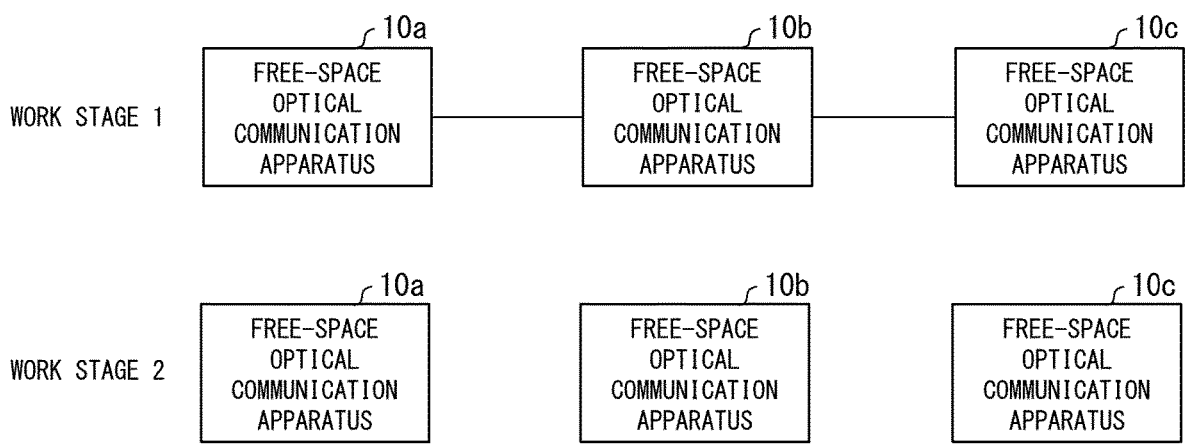

FIG. 6
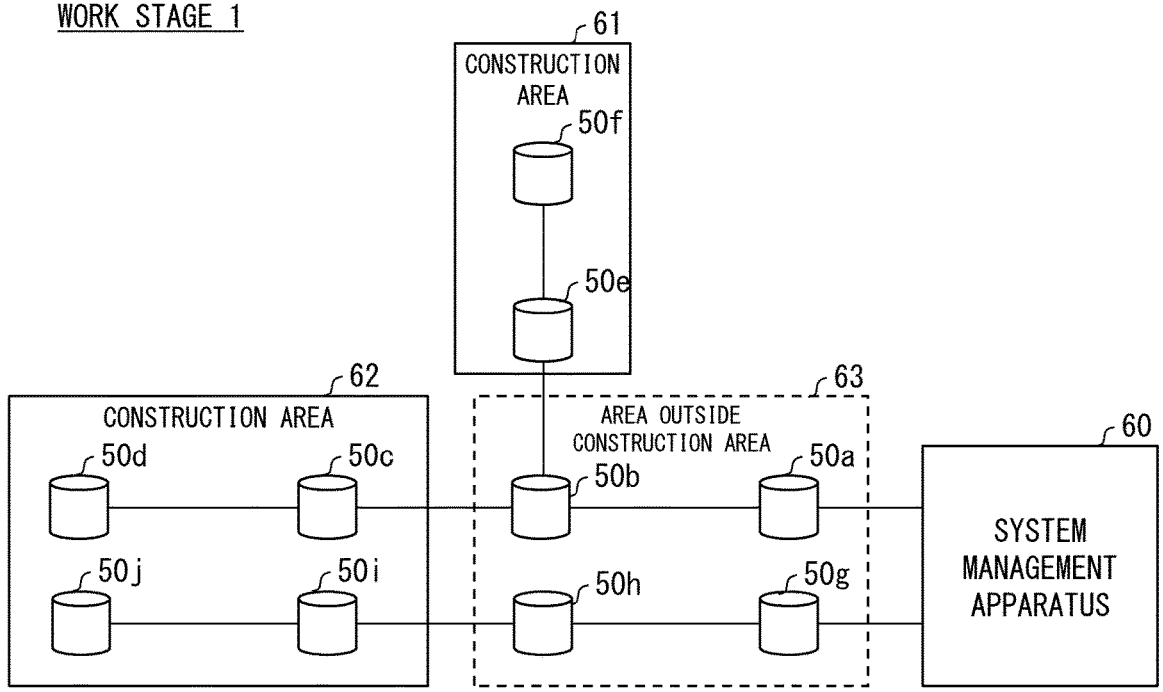
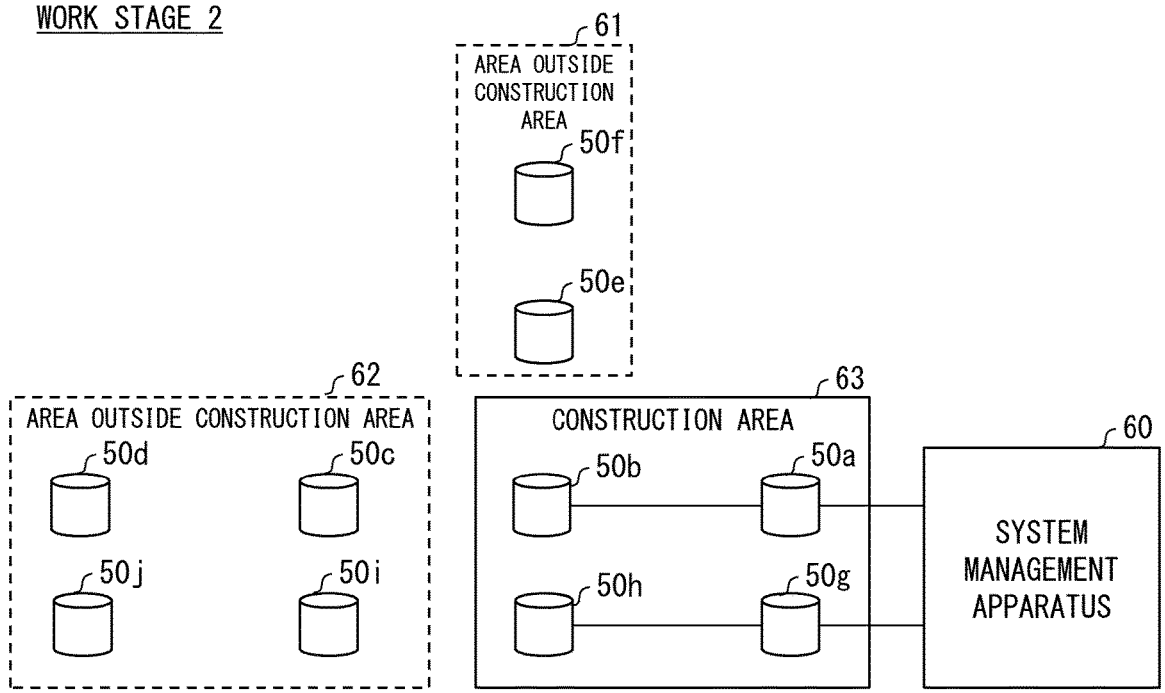

FIG. 12

| PLAN INFORMATION | | |
|---|---|---|
| WORK STAGE INFORMATION 1 | | |
| WORK STAGE IDENTIFICATION INFORMATION | TRANSITION DESTINATION | |
| APPARATUS IDENTIFICATION INFORMATION 1 | CONNECTION DESTINATION 1 | POSITION 1 |
| APPARATUS IDENTIFICATION INFORMATION 2 | CONNECTION DESTINATION 2 | POSITION 2 |
| ... | ... | ... |
| APPARATUS IDENTIFICATION INFORMATION N | CONNECTION DESTINATION N | POSITION N |
| WORK STAGE INFORMATION 2 | | |
| WORK STAGE IDENTIFICATION INFORMATION | TRANSITION DESTINATION | |
| APPARATUS IDENTIFICATION INFORMATION 1 | CONNECTION DESTINATION 1 | POSITION 1 |
| APPARATUS IDENTIFICATION INFORMATION 2 | CONNECTION DESTINATION 2 | POSITION 2 |
| ... | ... | ... |
| APPARATUS IDENTIFICATION INFORMATION N | CONNECTION DESTINATION N | POSITION N |
| ... | | |
| WORK STAGE INFORMATION N | | |
| WORK STAGE IDENTIFICATION INFORMATION | TRANSITION DESTINATION | |
| APPARATUS IDENTIFICATION INFORMATION 1 | CONNECTION DESTINATION 1 | POSITION 1 |
| APPARATUS IDENTIFICATION INFORMATION 2 | CONNECTION DESTINATION 2 | POSITION 2 |
| ... | ... | ... |
| APPARATUS IDENTIFICATION INFORMATION N | CONNECTION DESTINATION N | POSITION N |

FREE-SPACE OPTICAL COMMUNICATION CONTROL SYSTEM, FREE-SPACE OPTICAL COMMUNICATION CONTROL APPARATUS, AND FREE-SPACE OPTICAL COMMUNICATION CONTROL METHOD

This Nonprovisional application claims priority under 35 U.S.C. § 119 on Patent Application No. 2022-155305 filed in Japan on Sep. 28, 2022, the entire contents of which are hereby incorporated by reference.

TECHNICAL FIELD

The present invention relates to a free-space optical communication control system, free-space optical communication control apparatus, and free-space optical communication control method.

Background Art

With respect to the free-space optical communication (optical wireless communication), which is communication carried out with use of light propagating in space, a technique disclosed in, for example, Patent Literature 1 as a technique for considering a movement pattern, is the technique of applying an end user's movement pattern associated with rush hour to allocate a resource for free-space optical communication in accordance with the movement pattern when rush hour is about to start.

CITATION LIST

Patent Literature

[Patent Literature 1]
Japanese Translation of PCT International Application, Tokuhyo, No. 2020-503729

SUMMARY OF INVENTION

Technical Problem

However, since the technique disclosed in Patent Literature 1 is to control a resource of optical wireless communication in accordance with time, it can be impossible to carry out necessary control in a case where things do not progress on time.

For example, in a case where free-space optical communication apparatuses are used in a construction site or the like, the transition of work stages in the construction is not always on time.

An example object of the present invention is to provide a free-space optical communication control system, a free-space optical communication control apparatus, and a free-space optical communication control method that are capable of detecting the transition of work stages to control connection of a free-space optical communication control apparatus according to the transition of work stages detected.

Solution to Problem

An example aspect of a free-space optical communication control system of the present invention includes at least one processor, the at least one processor carrying out: a first detection process of detecting a change in a connection relationship between a first free-space optical communication apparatus and a second free-space optical communication apparatus adjacent to the first free-space optical communication apparatus; a second detection process of detecting a transition of work stages in accordance with the change in the connection relationship detected and plan information indicating a connection relationship between the first free-space optical communication apparatus and the second free-space optical communication apparatus in each of the work stages; and a connection control process of controlling, according to the transition of the work stages detected, which connection destination is connected to the first free-space optical communication apparatus.

An example aspect of a free-space optical communication control system of the present invention includes at least one processor, the at least one processor carrying out: a connection control process of controlling which connection destination is connected to free-space optical communication; a first detection process of detecting a change in a connection relationship with an adjacent free-space optical communication apparatus that is the connection destination of the free-space optical communication; and a second detection process of detecting a transition of work stages in accordance with the change in the connection relationship detected in the first detection process and with reference to plan information indicating a connection relationship of the free-space optical communication in each of the work stages, and in the connection control process, the at least one processor controlling, according to the transition of the work stages detected in the second detection process, which connection destination is connected to the free-space optical communication.

An example aspect of a free-space optical communication control method of the present invention including: a computer detecting a change in a connection relationship between a first free-space optical communication apparatus and a second free-space optical communication apparatus adjacent to the first free-space optical communication apparatus; the computer detecting a transition of work stages in accordance with the change in the connection relationship detected and plan information indicating connection relationship between the first free-space optical communication apparatus and the second free-space optical communication apparatus in each of the work stages; and the computer controlling, according to the transition of the work stages detected, which connection destination is connected to the first free-space optical communication apparatus.

Advantageous Effects of Invention

It is possible to detect a transition of work stages to control connection of a free-space optical communication apparatus according to the transition of the work stages detected.

BRIEF DESCRIPTION OF DRAWINGS

FIG. 1 is a block diagram of an example configuration of a free-space optical communication control system in accordance with a first example embodiment.

FIG. 2 is a diagram of an example connection relationship among free-space optical communication apparatuses in each work stage in accordance with the first example embodiment.

FIG. 6 is a diagram of an example connection relationship among free-space optical communication apparatuses in each work stage in the second example embodiment.

FIG. 12 is diagram of example plan information in the fourth example embodiment.

EXAMPLE EMBODIMENTS

Figure 3:
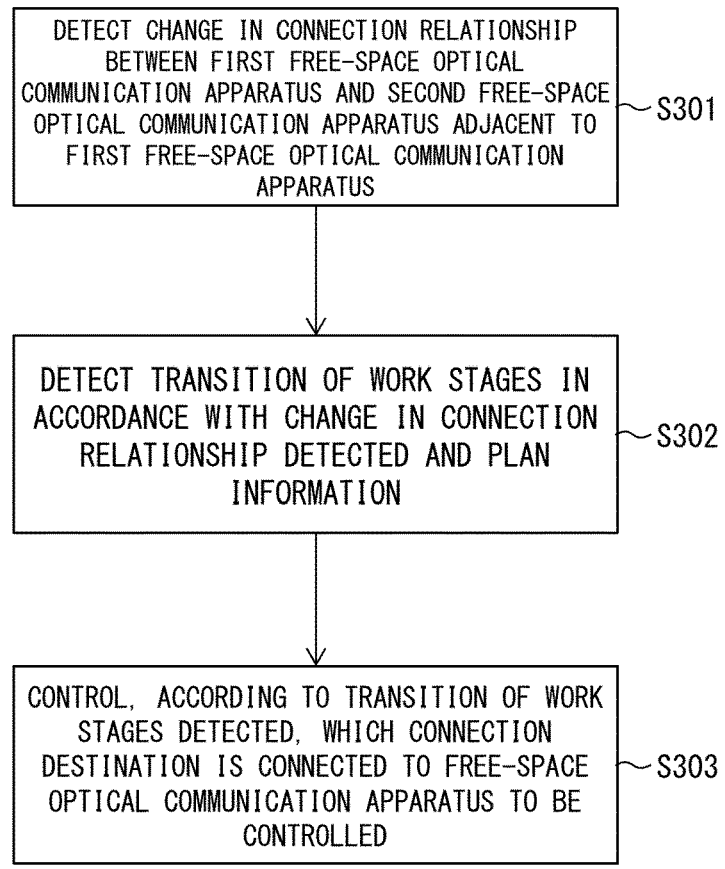
FIG. 3 is a flowchart of an example operation of the free-space optical communication control system in accordance with the first example embodiment.

First Example Embodiment (Free-Space Optical Communication Control System)

The following description will discuss a free-space optical communication control system 100 in accordance with a first example embodiment of the present invention, with reference to the drawings. The free-space optical communication control system 100 is a system for controlling connection between free-space optical communication apparatuses 10. A free-space optical communication network is a network which is formed by a plurality of free-space optical communication apparatuses and over which free-space optical communication is carried out via a free-space optical communication path set between the free-space optical communication apparatuses.

The present example embodiment can be suitably applied to work which is carried out with use of free-space optical communication and in which a connection relationship among the free-space optical communication apparatuses changes depending on the work stage. Examples of such work include, but not particularly limited to, construction and inspection.

Free-space optical communication is communication that is carried out with use of light propagating through space. Examples of the light used in the free-space optical communication can include a millimeter wave, a submillimeter wave, infrared light, visible light, and ultraviolet light. To set a free-space optical communication path between two free-space optical communication apparatuses, it is necessary to carry out, between the two free-space optical communication apparatuses, optical axis alignment for free-space optical communication. The alignment for free-space optical communication refers to aligning the optical axis of a light sending and receiving section of one of the free-space optical communication apparatuses with the optical axis of a light sending and receiving section of the other.

FIG. 1 is a functional block diagram of an example configuration of the free-space optical communication control system 100 in accordance with the first example embodiment of the present invention. In FIG. 1, each of the blocks indicates a function-by-function component. Accordingly, the blocks illustrated in FIG. 1 may be implemented in a single apparatus, or may be implemented in more than one apparatus. Further, some or all of the blocks may be implemented as functions with use of the cloud or the like. The free-space optical communication control system 100 includes a first detecting means 101, a second detecting means 102, and a connection control means 103.

The free-space optical communication control system 100 controls a free-space optical communication apparatus 10b. The free-space optical communication apparatus 10b controlled by the free-space optical communication control system 100 can be referred to as a first free-space optical communication apparatus. The free-space optical communication control system 100 may have a configuration so as to be capable of communicating with the free-space optical communication apparatus 10b, or may have a configuration such that the free-space optical communication control system 100 is partially or wholly included in the free-space optical communication apparatus 10b.

FIG. 2 is a diagram of an example connection relationship among the free-space optical communication apparatuses in each work stage. The connection refers to a state in which free-space optical communication is feasible between the free-space optical communication apparatuses. It should be noted that optical axis alignment can be said to have been carried out between the free-space optical communication apparatuses connected to each other. The connection relationship refers to whether the free-space optical communication apparatuses are connected to each other. In the example illustrated in FIG. 2, there are a free-space optical communication apparatus 10a and a free-space optical communication apparatus 10c, which are regarded as the free-space optical communication apparatuses adjacent to the free-space optical communication apparatus 10b. The free-space optical communication apparatuses 10a, 10b, and 10c can be referred to collectively as free-space optical communication apparatuses 10. In addition, as used herein, a second free-space optical communication apparatus adjacent to the first free-space optical communication apparatus refers to a free-space optical communication apparatus that is at a distance from the first free-space optical communication apparatus, the distance allowing connection with the first free-space optical communication apparatus by free-space optical communication. There may be a single second free-space optical communication apparatus, or more than one second free-space optical communication apparatus.

In the example illustrated in FIG. 2, the connection state of the free-space optical communication apparatuses 10a, 10b, and 10c in a work stage 1 is that the free-space optical communication apparatus 10a and the free-space optical communication apparatus 10c are connected to the free-space optical communication apparatus 10b, and the connection state of the free-space optical communication apparatuses 10a, 10b, and 10c in a work stage 2 is that the free-space optical communication apparatus 10a and the free-space optical communication apparatus 10c are not connected to the free-space optical communication apparatus 10b.

The first detecting means 101 detects a change in a connection relationship between the free-space optical communication apparatus 10b (first free-space optical communication apparatus) and a free-space optical communication apparatus (second free-space optical communication apparatus; for example, the free-space optical communication apparatus 10a or 10c) adjacent to the free-space optical communication apparatus 10b. The first detecting means 101 may detect a change in a connection relationship between the free-space optical communication apparatus 10b and the free-space optical communication apparatus 10a, may detect a change in the connection relationship between the free-space optical communication apparatus 10b and the free-space optical communication apparatus 10c, or may detect a change in the connection relationships between the free-space optical communication apparatus 10b and the free-space optical communication apparatus 10a and between the connection relationship between the free-space optical communication apparatus 10b and the free-space optical communication apparatus 10c. The free-space optical communication apparatus (second free-space optical communication apparatus) adjacent to the free-space optical communication apparatus 10b may be restated as an adjacent free-space optical communication apparatus that is a connection destination of free-space optical communication carried out by the free-space optical communication apparatus 10b.

The second detecting means 102 detects a transition of work stages in accordance with (i) the change in the connection relationship detected by the first detecting means 101 and (ii) plan information indicating a connection relationship among the free-space optical communication apparatuses 10 in each of the work stages. A transition of work stages means that a work stage being carried out transitions according to a plan. The transition of work stages includes not only a transition to a next work stage in the order specified in the plan but also a transition to a previous work stage in the order specified in the plan or to any other work stage. The plan information indicates the order of the work stages that constitute the plan, and the details of each of the work stages. In the present example embodiment, the plan information indicates a connection relationship among the free-space optical communication apparatuses in each work stage as illustrated in FIG. 2.

The second detecting means 102 detects a transition of the work stages by determining the work stage the connection relationship of which matches the connection relationship that has changed and that has been detected by the first detecting means 101. Accordingly, in a case where the connection relationship that has changed and that has been detected by the first detecting means 101 does not match the connection relationship in the current work stage but matches the connection relationship in the next work stage, the second detecting means 102 can detect the transition to the next work stage.

For example, assume that the first detecting means 101 has detected a change (termination) in the connection relationship between the free-space optical communication apparatus 10b and the free-space optical communication apparatus 10a from "connection" to "disconnection". In this case, the second detecting means 102 can determine, with reference to the plan information, that the connection relationship between the free-space optical communication apparatus 10b and the free-space optical communication apparatus 10a which is "disconnection" matches the connection relationship in the work stage 2, and thus detect the transition from the work stage 1 to the work stage 2.

The connection control means 103 controls, according to the transition of the work stages detected by the second detecting means 102, which connection destination is connected to the free-space optical communication apparatus 10b (first free-space optical communication apparatus). For example, the connection control means 103 refers to the plan information to control which connection destination is connected to the free-space optical communication apparatus 10b, such that the connection relationship in the work stage after the transition is matched, the transition being the transition of work stages detected by the second detecting means 102.

For example, assume that the second detecting means 102 has detected the transition from the work stage 1 to the work stage 2, and the plan information specifies that the connection relationship between the free-space optical communication apparatus 10b and the free-space optical communication apparatus 10c is "disconnection" in the work stage 2. In this case, the connection control means 103 controls which connection destination is connected to the free-space optical communication apparatus 10b, such that the connection relationship between the free-space optical communication apparatus 10b and the free-space optical communication apparatus 10c is "disconnection".

With the above configuration, it is possible for the free-space optical communication control system 100 to detect a transition of work stages to control connection among the free-space optical communication apparatuses 10 according to the transition of the work stages detected. The above configuration allows quick establishment of a free-space optical communication network according to the work stages even under the situation where the connection relationship among the free-space optical communication apparatuses changes depending on the work stages.

(Free-Space Optical Communication Control Method)

The operation (free-space optical communication control method) of the free-space optical communication control system in accordance with the first example embodiment will be described with use of the drawings. FIG. 3 is a flowchart of an example operation of the free-space optical communication control system 100.

In step S301, the first detecting means 101 detects a change in the connection relationship between the free-space optical communication apparatus 10b (first free-space optical communication apparatus) and a free-space optical communication apparatus (second free-space optical communication apparatus; for example, the free-space optical communication apparatus 10a or 10c) adjacent to the free-space optical communication apparatus 10b.

In step S302, the second detecting means 102 detects a transition of work stages in accordance with the change in the connection relationship detected and plan information indicating a connection relationship among the free-space optical communication apparatuses 10 in each of the work stages.

Subsequently, in step S303, the connection control means 103 controls, according to the transition of the work stages detected, which connection destination is connected to the free-space optical communication apparatus 10b (first free-space optical communication apparatus).

(Free-Space Optical Communication Control Apparatus)

Figure 4:
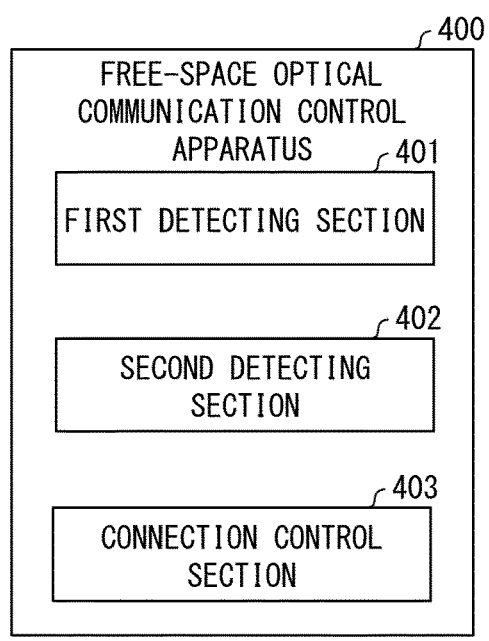
FIG. 4 is a block diagram of an example configuration of a free-space optical communication control apparatus in accordance with the first example embodiment.

FIG. 4 is a block diagram of an example configuration of a free-space optical communication control apparatus 400 in accordance with the first example embodiment of the present invention. A first detecting section 401 has a function equivalent to the function of the first detecting means 101, and detects a change in a connection relationship between the free-space optical communication apparatus 10b (first free-space optical communication apparatus) and a free-space optical communication apparatus (second free-space optical communication apparatus; for example, free-space optical communication apparatus 10a or 10c) adjacent to the free-space optical communication apparatus 10b. A second detecting section 402 has a function equivalent to the function of the second detecting means 102, and detects a transition of work stages in accordance with the change in the connection relationship detected by the first detecting section 401 and plan information indicating a connection relationship among the free-space optical communication apparatuses 10 in each of the work stages. A connection control section 403 has a function equivalent to the function of the connection control means 103, and controls, according to the transition of the work stages detected by the second detecting section 402, which connection destination is connected to the free-space optical communication apparatus 10b (first free-space optical communication apparatus).

The first detecting section 401, the second detecting section 402, and the connection control section 403 may each be computer equipment in which a processor executes a program stored in a memory so that a process is carried out. Each of the first detecting section 401, the second detecting section 402, and the connection control section 403 may be partially or wholly included in the free-space optical communication apparatus 10b (first free-space optical communication apparatus), or may be computer equipment that communicates with the free-space optical communication apparatus 10b. For example, the first detecting section 401, the second detecting section 402, and the connection control section 403 may be provided by a single piece of computer equipment, or may be provided by a computer equipment group that operates by collaboration among pieces of computer equipment or by a server equipment group that operates through collaboration among pieces of server equipment. With the free-space optical communication control apparatus 400, it is possible to obtain an example advantage equivalent to the example advantage of the free-space optical communication control system 100.

Second Example Embodiment

A free-space optical communication control system 500 in accordance with a second example embodiment will be described. The same reference sign is assigned to a component that has the same function as the component described in the first example embodiment, and the description thereof is omitted.

A case described in the following description is the case of application to a construction site in which free-space optical communication is used and in which a connection relationship among the free-space optical communication apparatuses changes depending on the work stages of the construction. However, the present example embodiment is not limited thereto, but can be applied to work in general in which a connection relationship among free-space optical communication apparatuses changes depending on the work stages.

Figure 5:
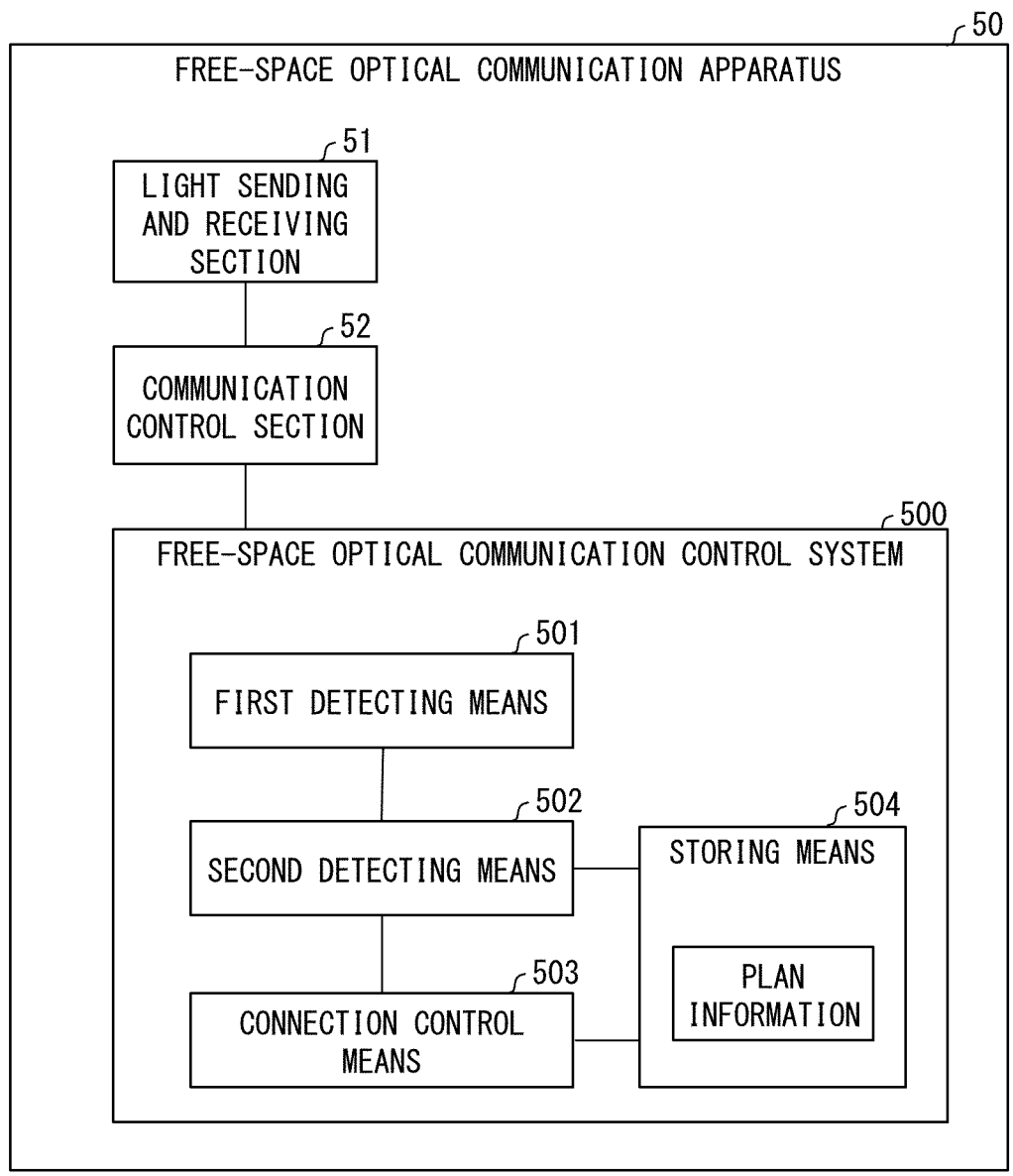
FIG. 5 is a block diagram of an example configuration of a free-space optical communication apparatus that incorporates a free-space optical communication apparatus that includes a free-space optical communication control system in accordance with a second example embodiment.

FIG. 5 is a block diagram of an example configuration of a free-space optical communication apparatus 50 that includes the free-space optical communication control system 500 in accordance with the second example embodiment of the present invention. In FIG. 5, each of the blocks indicates a function-by-function component. Accordingly, the blocks illustrated in FIG. may be implemented in a single apparatus, or may be implemented in more than one apparatus. Further, some or all of the blocks may be implemented as functions with use of the cloud or the like.

In the example illustrated in FIG. 5, the free-space optical communication apparatus 50 includes the free-space optical communication control system 500 in addition to a light sending and receiving section 51 and a communication control section 52. However, the present example embodiment is not limited to this configuration, but some or all of the free-space optical communication control system 500 may be provided outside the free-space optical communication apparatus 50 (for example, a system management apparatus 60 to be described later).

In the example illustrated in FIG. 5, for the free-space optical communication control system 500, the free-space optical communication apparatus 50 that includes the free-space optical communication control system 500 is a "first free-space optical communication apparatus" that is to be controlled by the free-space optical communication control system 500 (see the first example embodiment). Even in a case where a part of the free-space optical communication control system 500 is provided in the free-space optical communication apparatus 50 and the remainder is outside the free-space optical communication apparatus 50, the free-space optical communication apparatus 50 including the part of the free-space optical communication control system 500 is the "first free-space optical communication apparatus", which is to be controlled by the free-space optical communication control system 500. The free-space optical communication apparatus 50 adjacent to the free-space optical communication apparatus 50 that is the first free-space optical communication apparatus is a "second free-space optical communication apparatus". Specifically, the first free-space optical communication apparatus and the second free-space optical communication apparatus change according to the configuration of the free-space optical communication control system 500.

In a case where the free-space optical communication control system 500 is wholly located in an apparatus (for example, the system management apparatus 60 to be described later) external to the free-space optical communication apparatus 50, the free-space optical communication control system 500 may control a plurality of free-space optical communication apparatuses 50. In this case, in a process in which the free-space optical communication control system 500 controls one free-space optical communication apparatus 50, the one free-space optical communication apparatus 50 corresponds to the "first free-space optical communication apparatus", and in a process in which the free-space optical communication control system 500 controls another free-space optical communication apparatus 50, the another free-space optical communication apparatus 50 corresponds to the "first free-space optical communication apparatus". Thus, the first free-space optical communication apparatus and the second free-space optical communication apparatus change for each of the processes of the free-space optical communication control system 500.

As illustrated in FIG. 5, the free-space optical communication control system 500 includes a first detecting means 501, a second detecting means 502, a connection control means 503, and a storing means 504.

The light sending and receiving section 51 sends and receives light used in free-space optical communication. The communication control section 52 controls the light sending and receiving section 51 to carry out free-space optical communication.

Like the first detecting means 101 in the first example embodiment, the first detecting means 501 detects a change in a connection relationship between the free-space optical communication apparatus 50 that is the first free-space optical communication apparatus and the second free-space optical communication apparatus adjacent to the free-space optical communication apparatus 50 that is the first free-space optical communication apparatus.

Like the second detecting means 102 in the first example embodiment, the second detecting means 502 detects a transition of work stages in accordance with the change in the connection relationship detected by the first detecting means 501 and with reference to plan information indicating a connection relationship among the free-space optical communication apparatuses 50 in each work stage.

Like the connection control means 103 in the first example embodiment, the connection control means 503 controls, according to the transition of the work stages detected by the second detecting means 502, which connection destination is connected to the free-space optical communication apparatus 50 that is the first free-space optical communication apparatus.

The storing means 504 includes storage that stores plan information, and provides the second detecting means 502 and the connection control means 503 with the plan information.

FIG. 6 is a diagram of an example connection relationship among the free-space optical communication apparatuses 50 in each work stage. In the example illustrated in FIG. 6, free-space optical communication apparatuses 50a to 50j are illustrated as free-space optical communication apparatuses 50. The free-space optical communication apparatuses 50a to 50j can be referred to collectively as free-space optical communication apparatuses 50. Each of the free-space optical communication apparatuses 50 includes a free-space optical communication control system 500 which controls the corresponding free-space optical communication apparatus 50. In other words, for the free-space optical communication control system 500 provided in each of the free-space optical communication apparatuses 50, the corresponding free-space optical communication apparatus 50 is the first free-space optical communication apparatus.

Each of the free-space optical communication apparatuses 50 is directly or indirectly connected to the system management apparatus 60 to carry out communication with the system management apparatus 60.

Specifically, the free-space optical communication apparatuses 50a and 50g are connected to the system management apparatus 60, and the free-space optical communication apparatus 50b is connected to the free-space optical communication apparatus 50a. To the free-space optical communication apparatus 50b, the free-space optical communication apparatuses 50c and 50e are connected. To the free-space optical communication apparatus 50c, the free-space optical communication apparatus 50d is connected. To the free-space optical communication apparatus 50e, the free-space optical communication apparatus 50f is connected. To the free-space optical communication apparatus 50g, the free-space optical communication apparatus 50h is connected. To the free-space optical communication apparatus 50h, the free-space optical communication apparatus 50i is connected. To the free-space optical communication apparatus 50i, the free-space optical communication apparatus 50j is connected.

At a construction site in which each of the free-space optical communication apparatuses 50 is used, a construction area and an area outside the construction area are provided. These areas change depending on the work stages.

In the work stage 1, an area 61 in which the free-space optical communication apparatuses 50e and 50f are disposed, and an area 62 in which the free-space optical communication apparatuses 50c, 50d, 50i, and 50j are disposed are construction areas. An area 63 in which the free-space optical communication apparatuses 50a, 50b, 50g, and 50h are disposed is outside the construction area.

In the work stage 2, the areas 61 and 62 are outside the construction area, and the area 63 is the construction area. Because of being outside the construction area, the free-space optical communication apparatuses 50c, 50d, 50e, 50f, 50i, and 50j within the areas 61 and 62 are unnecessary, and the connections with the respective adjacent free-space optical communication apparatuses 50 thereof are terminated accordingly.

Figure 7:
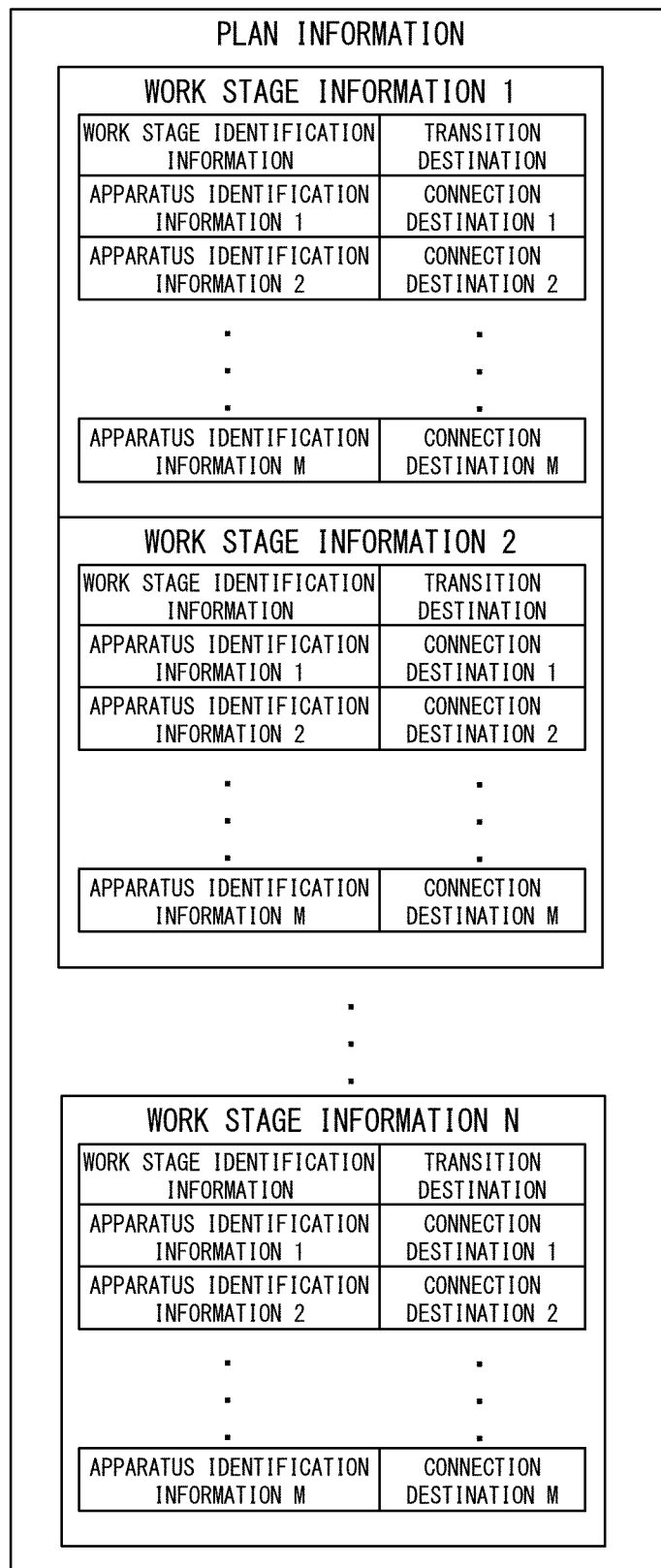
FIG. 7 is a diagram of example plan information in the second example embodiment.

FIG. 7 is a diagram of an example of the plan information. The plan information indicates a connection relationship among the free-space optical communication apparatuses 50 in each work stage as illustrated in FIG. 6. The plan information includes work stage information on each of the work stages. Each work stage information includes: work stage identification information for identifying a work stage; transition information that indicates a possible work stage to which the work stage will transition; and information that indicates identification information regarding each of the free-space optical communication apparatuses 50 and the connection destination of each of the free-space optical communication apparatuses 50. The transition information mainly indicates a work stage to be carried out next. However, the transition information may include a previous work stage in a case where the work stage may return to the work stage previously carried out.

In the example illustrated in FIG. 7, the plan information includes the work stage information 1 to N. The work stage identification information contained in each work stage information is not particularly limited. For example, the work stage identification information may be the following: the work stage identification information contained in the work stage information 1 is "1", the work stage identification information contained in the work stage information 2 is "2", and the work stage identification information contained in the work stage information N is N. The transition information may include work stage identification information regarding possible work stages into which a transition will be made. Each work stage information includes pieces of apparatus identification information 1 to M and connection destinations 1 to M that correspond to the pieces of apparatus identification information 1 to M, respectively. Each of the pieces of apparatus identification information refers to one of the free-space optical communication apparatuses 50. Each of the connection destinations refers to one of the free-space optical communication apparatuses 50. Each of the pieces of apparatus identification information and the connection destination corresponding to that apparatus identification information indicate that the free-space optical communication apparatus 50 indicated by that apparatus identification information and the free-space optical communication apparatus 50 indicated by the connection destination are in a connected state.

For example, as the plan information corresponding to the work stage 1 and the work stage 2 illustrated in FIG. 6, the work stage information 1 may indicate that: the connection destination of the free-space optical communication apparatus 50*a* is the free-space optical communication apparatus 50*b*; the connection destinations of the free-space optical communication apparatus 50*b* are the free-space optical communication apparatuses 50*a*, 50*c*, and 50*e*; the connection destinations of the free-space optical communication apparatus 50*c* are the free-space optical communication apparatuses 50*b* and 50*d*; the connection destination of the free-space optical communication apparatus 50*d* is the free-space optical communication apparatus 50*c*; the connection destinations of the free-space optical communication apparatuses 50*e* are the free-space optical communication apparatuses 50*b* and 50*f*; the connection destination of the free-space optical communication apparatus 50*f* is the free-space optical communication apparatus 50*e*; the connection destination of the free-space optical communication apparatus 50*g* is the free-space optical communication apparatus 50*h*; the connection destinations of the free-space optical communication apparatus 50*h* are the free-space optical communication apparatuses 50*g* and 50*i*; the connection destinations of the free-space optical communication apparatuses 50*i* are the free-space optical communication apparatuses 50*h* and 50*j*; and the connection destination of the free-space optical communication apparatus 50*j* is the free-space optical communication apparatus 50*i*. The work stage information 2 may indicate that: the connection destination of the free-space optical communication apparatus 50*a* is the free-space optical communication apparatus 50*b*; the connection destination of the free-space optical communication apparatus 50*b* is the free-space optical communication apparatus 50*a*; the connection destination of the free-space optical communication apparatus 50*g* is the free-space optical communication apparatus 50*h*; the connection destination of the free-space optical communication apparatus 50*h* is the free-space optical communication apparatus 50*g*; and there is no other connection destination of the free-space optical communication apparatus 50.

Figure 8:
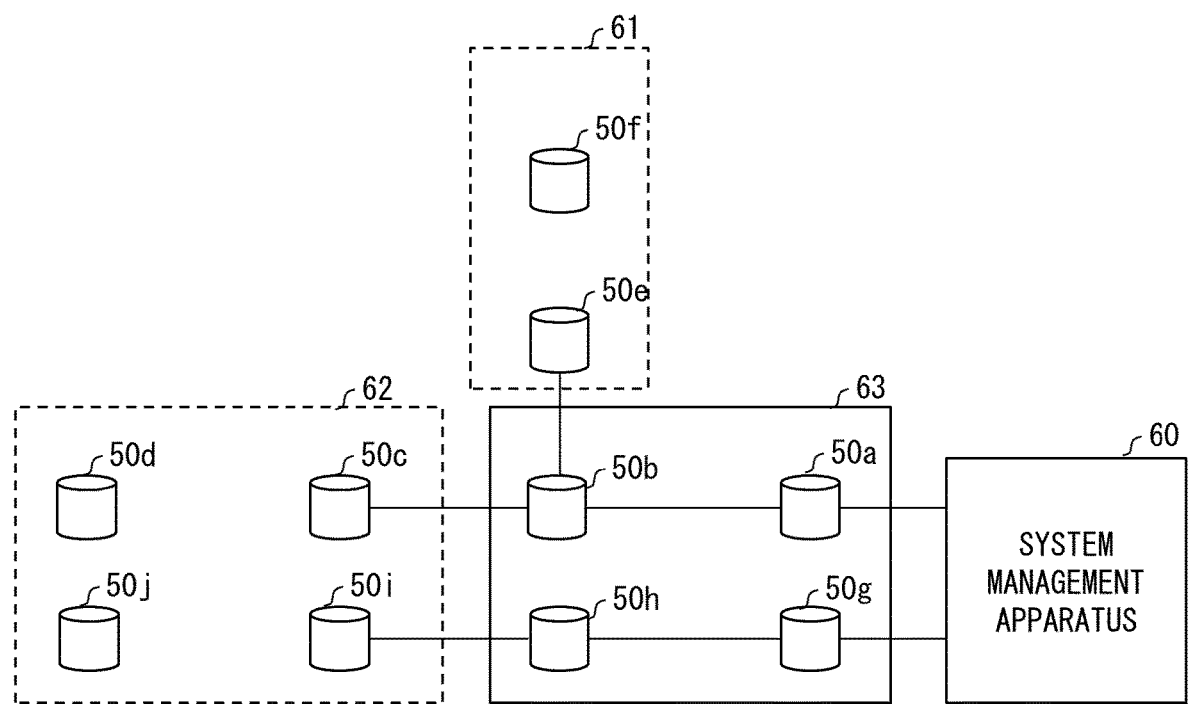
FIG. 8 is a diagram of an example operation for controlling which connection destination is connected in the second example embodiment.

Subsequently, the operation of the free-space optical communication control system 500 in the example illustrated in FIG. 6 will be described with reference to FIG. 8. For example, in a case where the construction is completed in the area 61 and the connection between the free-space optical communication apparatus 50*f* and the free-space optical communication apparatus 50*e* has been manually terminated, the free-space optical communication control system 500 of the free-space optical communication apparatus 50*e* operates as follows. In the free-space optical communication control system 500, the free-space optical communication apparatus 50*e* corresponds to the first free-space optical communication apparatus, and the free-space optical communication apparatuses 50*b* and 50*f* correspond to the second free-space optical communication apparatus. First, the first detecting means 501 detects that the connection with the free-space optical communication apparatus 50*f* has been terminated. With reference to the plan information, the second detecting means 502 determines that the connection state in which there is no connection with the free-space optical communication apparatus 50*f* does not match the connection state of the work stage 1 but matches the connection state of the work stage 2, and determines a transition to the work stage 2. With reference to the plan information, the connection control means 503 determines in work stage 2 that the connection destinations of the free-space optical communication apparatus 50*e* do not include the free-space optical communication apparatus 50*b*, and terminates the connection between the free-space optical communication apparatus 50*e* and the free-space optical communication apparatus 50*b*. Similarly, in a case where the connection between the free-space optical communication apparatus 50*d* and the free-space optical communication apparatus 50*c* and the connection between the free-space optical communication apparatus 50*j* and the free-space optical communication apparatus 50*i* have been manually terminated, the free-space optical communication control system 500 of the free-space optical communication apparatus 50*c* and the free-space optical communication control system 500 of the free-space optical communication apparatus 50*i* detect a transition to the work stage 2, and terminate the connection between the free-space optical communication apparatus 50*c* and the free-space optical communication apparatus 50*b* and the connection between the free-space optical communication apparatus 50*i* and the free-space optical communication apparatus 50*h*, respectively. Thus, even in a situation where the connection relationship among the free-space optical communication apparatuses changes depending on the work stages, it is possible for the free-space optical communication control system 500 provided in each of the free-space optical communication apparatuses 50 to quickly establish a free-space optical communication network according to the work stages.

In addition, in a case where the free-space optical communication apparatus 50 includes the free-space optical communication control system 500, a time lag due to communication does not occur in contrast to the connection destination control carried out according to instructions issued by the system management apparatus 60 that manages the free-space optical communication apparatus 50 or by an input of instructions performed by a person. It is therefore possible to quickly establish a free-space optical communication network according to the work stages.

(Variation)

In the above description, a configuration in which each of the free-space optical communication apparatuses 50 includes the free-space optical communication control system 500 has been mainly described, but the present example embodiment is not limited to the configuration. The free-space optical communication control system 500 may partially or wholly included in the system management apparatus 60. For example, the first detecting means 501 may be included in the free-space optical communication apparatus 50, and the second detecting means 502, the connection control means 503, and the storing means 504 may be included the system management apparatus 60. Alternatively, for example, the first detecting means 501, the second detecting means 502, the connection control means 503, and the storing means 504 may be included in the system management apparatus 60. In this case, where the system management apparatus 60 includes the connection control means 503 that corresponds to the free-space optical communication apparatus 50 (first free-space optical communication apparatus), the connection control means 503 may communicate with the corresponding free-space optical communication apparatus 50 (first free-space optical communication apparatus) to provide instructions for control. The instructions for control may include scan direction instructions and the identification information regarding the second free-space optical communication apparatus that is the connection destination.

In the above description, the second example embodiment as the free-space optical communication control system 500 has been described. The free-space optical communication control system 500 in accordance with the second example embodiment may be incorporated into a single apparatus to form a free-space optical communication control apparatus. In that case, as described above, the free-space optical communication control apparatus may be included in the free-space optical communication apparatus (first free-space optical communication apparatus) to be controlled by the free-space optical communication control apparatus. The free-space optical communication control method in accordance with the second example embodiment may be the operation of the free-space optical communication control system 500 in accordance with the second example embodiment. In that case, as described above, an agent that carries out the free-space optical communication control method may be included in the free-space optical communication apparatus (first free-space optical communication apparatus) to be controlled in the free-space optical communication control method.

Third Example Embodiment

A free-space optical communication control system 900 in accordance with a third example embodiment will be described. The same reference sign is assigned to a component that has the same function as the component described in the first or second example embodiment, and the description thereof is omitted.

Figure 9:
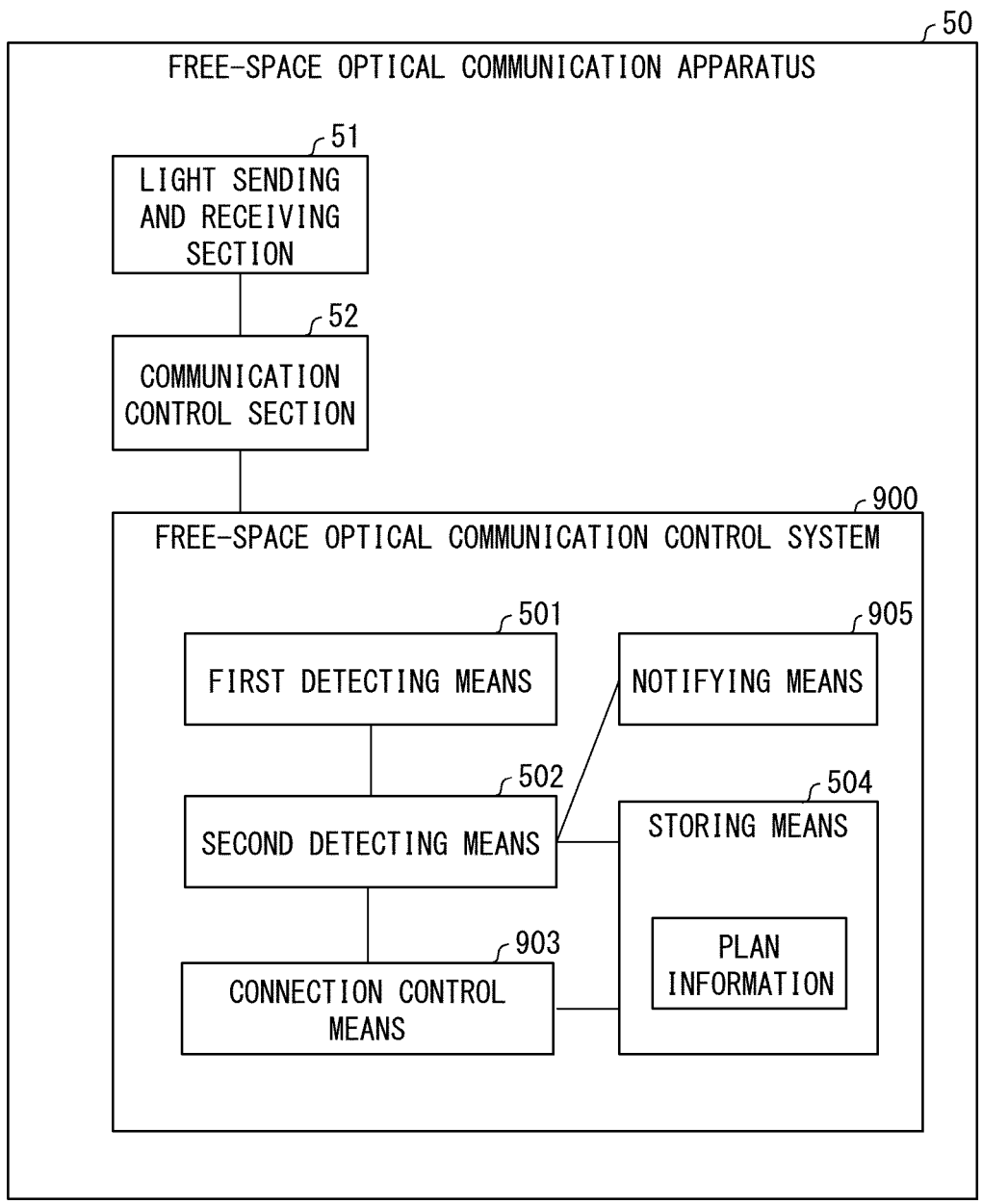
FIG. 9 is a block diagram of an example configuration of a free-space optical communication control system in accordance with a third example embodiment.

FIG. 9 is a block diagram of an example configuration of the free-space optical communication control system 900 in accordance with the third example embodiment of the present invention. In FIG. 9, each of the blocks indicates a function-by-function component. Accordingly, the blocks illustrated in FIG. 9 may be implemented in a single apparatus, or may be implemented in more than one apparatus. Further, some or all of the blocks may be implemented as functions with use of the cloud or the like. As illustrated in FIG. 9, the free-space optical communication control system 900 includes a first detecting means 501, a second detecting means 502, a connection control means 903, a storing means 504, and a notifying means 905. As in the second example embodiment, the free-space optical communication control system 900 is included in a free-space optical communication apparatus 50, and this free-space optical communication apparatus 50 is the "first free-space optical communication apparatus", which is to be controlled by the free-space optical communication control system 900.

The notifying means 905 notifies the free-space optical communication apparatus 50 (third free-space optical communication apparatus) which is not the free-space optical communication apparatus 50 (first free-space optical communication apparatus) including the free-space optical communication control system 900, of a transition of work stages detected by the second detecting means 502. For example, the notifying means 905 may control the communication control section 52 to transmit a notification via free-space optical communication, or may transmit the notification via another communication means (e.g., wireless communication means that is not illustrated). The third free-space optical communication apparatus may be restated as a notification destination free-space optical communication apparatus.

The notification destination which is notified by the notifying means 905 of the transition of the work stages is not particularly limited. The transition of the work stages may be notified to all the third free-space optical communication apparatuses, may be notified to the third free-space optical communication apparatus that is directly or indirectly connected to a system management apparatus 60, or may be notified to the third free-space optical communication apparatus that performs relay between a free-space optical communication apparatus 50 (first free-space optical communication apparatus) that includes a free-space optical communication control system 900 and the system management apparatus 60 in the work stage after the transition.

The notifying means 905 may also identify, in accordance with the plan information and according to the transition of the work stages, the third free-space optical communication apparatus in which a change in a connection relationship with an adjacent free-space optical communication apparatus 50 occurs, and notify the third free-space optical communication apparatus identified of the transition of the work stages.

The free-space optical communication apparatus 50 that is directly or indirectly connected to the system management apparatus 60 refers to the free-space optical communication apparatus 50 that is connected to be capable of communicating with the system management apparatus 60. The free-space optical communication apparatus 50 directly connected to the system management apparatus 60 is the free-space optical communication apparatus 50 that communicates directly with the system management apparatus 60. The free-space optical communication apparatus 50 indirectly connected to the system management apparatus 60 is the free-space optical communication apparatus 50 that communicates with the system management apparatus 60 via another free-space optical communication apparatus.

Figure 10:
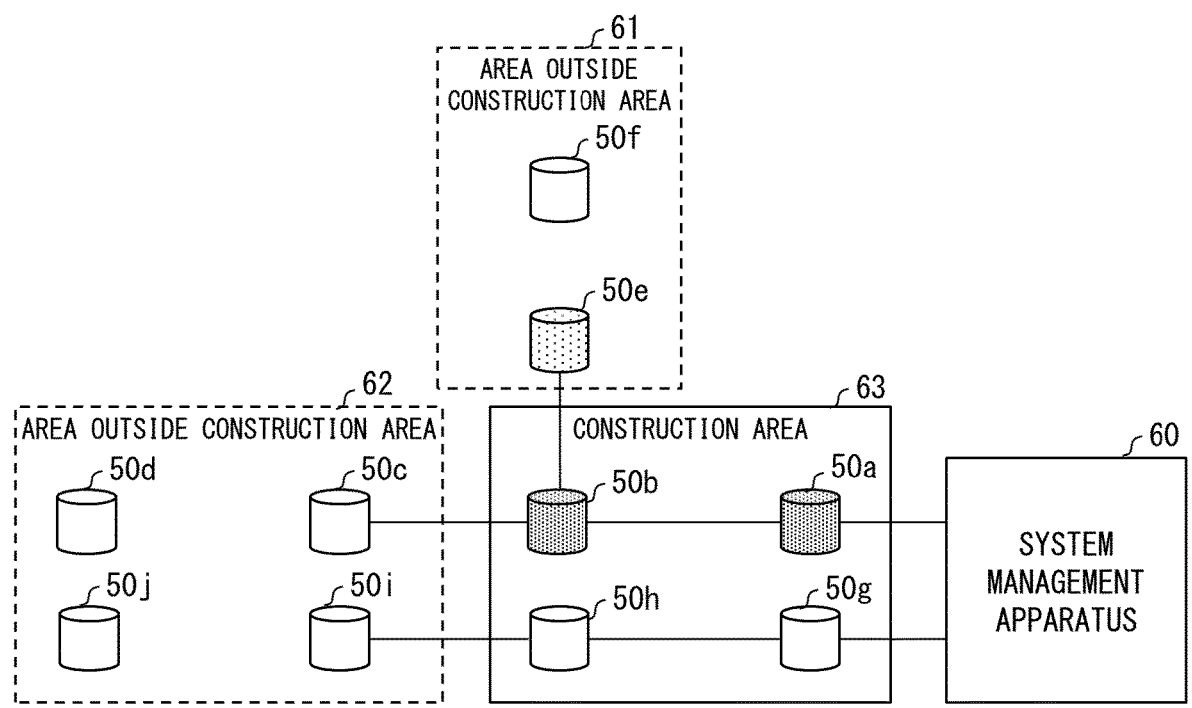
FIG. 10 is a diagram of an example operation for providing a notification of a transition of work stages in the third example embodiment.

For example, in the example illustrated in FIG. 10, in the free-space optical communication control system 900 of the free-space optical communication apparatus 50e, in a case where the second detecting means 502 detects the transition to the work stage 2, the notifying means 905 may notify, in the work stage 2 after the transition, the free-space optical communication apparatuses 50b and 50a that performs relay between the free-space optical communication apparatus 50e and the system management apparatus 60 of information that indicates the transition to the work stage 2. This enables the free-space optical communication control system 900 of the free-space optical communication apparatus 50e to notify, the transition of the work stages, to the free-space optical communication apparatuses 50 involved in the free-space optical communication carried out by the free-space optical communication apparatus 50e with the system management apparatus 60. This allows a minimum of notification that is required for ensuring the free-space optical communication carried out by the free-space optical communication apparatus 50e with the system management apparatus 60.

For example, in the example illustrated in FIG. 10, in the free-space optical communication control system 900 of the free-space optical communication apparatus 50e, in a case where the second detecting means 502 detects the transition to the work stage 2, the notifying means 905 may notify, the information indicating the transition to the work stage 2, to the free-space optical communication apparatuses 50b to 50d, 50f, and 50h to 50j, which are subjected to changes in the connection relationship with the free-space optical communication apparatuses 50 adjacent thereto according to the transition from the work stage 1 to the work stage 2. This allows a minimum of notification required for coping with the transition of the work stages.

By the notifying means 905 notifying the third free-space optical communication apparatus of the transition of the work stages detected, it is possible to cause control of a connection destination of the third free-space optical communication apparatus to be carried out. Specifically, the connection control means of the free-space optical communication control system that controls the third free-space optical communication apparatus that has been notified of the transition of the work stages may control, in accordance with the transition of the work stages notified and the plan information, which connection destination is connected to the third free-space optical communication apparatus.

For example, in a case where there is the notification of the transition of work stages, the connection control means of the free-space optical communication control system that controls the third free-space optical communication apparatus that has been notified of the transition of work stages may carry out the same control that is carried out when the second detecting means detects a transition of work stages. Thus, in a case where the free-space optical communication control system 900 of one free-space optical communication apparatus 50 detects a transition of work stages, it is possible to carry out control in accordance with the transition of the work stages detected, also in the free-space optical communication control system 900 of another free-space optical communication apparatuses 50. This allows automation of control of a connection relationship associated with the transition of the work stages.

In the above description, the third example embodiment as the free-space optical communication control system 900 has been described. The free-space optical communication control system 900 in accordance with the third example embodiment may be incorporated into a single apparatus to form a free-space optical communication control apparatus. In that case, as described above, the free-space optical communication control apparatus may be included in the free-space optical communication apparatus (first free-space optical communication apparatus) to be controlled by the free-space optical communication control apparatus. The free-space optical communication control method in accordance with the third example embodiment may be the operation of the free-space optical communication control system 900 in accordance with the third example embodiment. In that case, as described above, an agent that carries out the free-space optical communication control method may be included in the free-space optical communication apparatus (first free-space optical communication apparatus) to be controlled in the free-space optical communication control method.

Fourth Example Embodiment

A free-space optical communication control system 1100 in accordance with a fourth example embodiment will be described. The same reference sign is assigned to a component that has the same function as the component described in the first to third example embodiments, and the description thereof is omitted.

Figure 11:
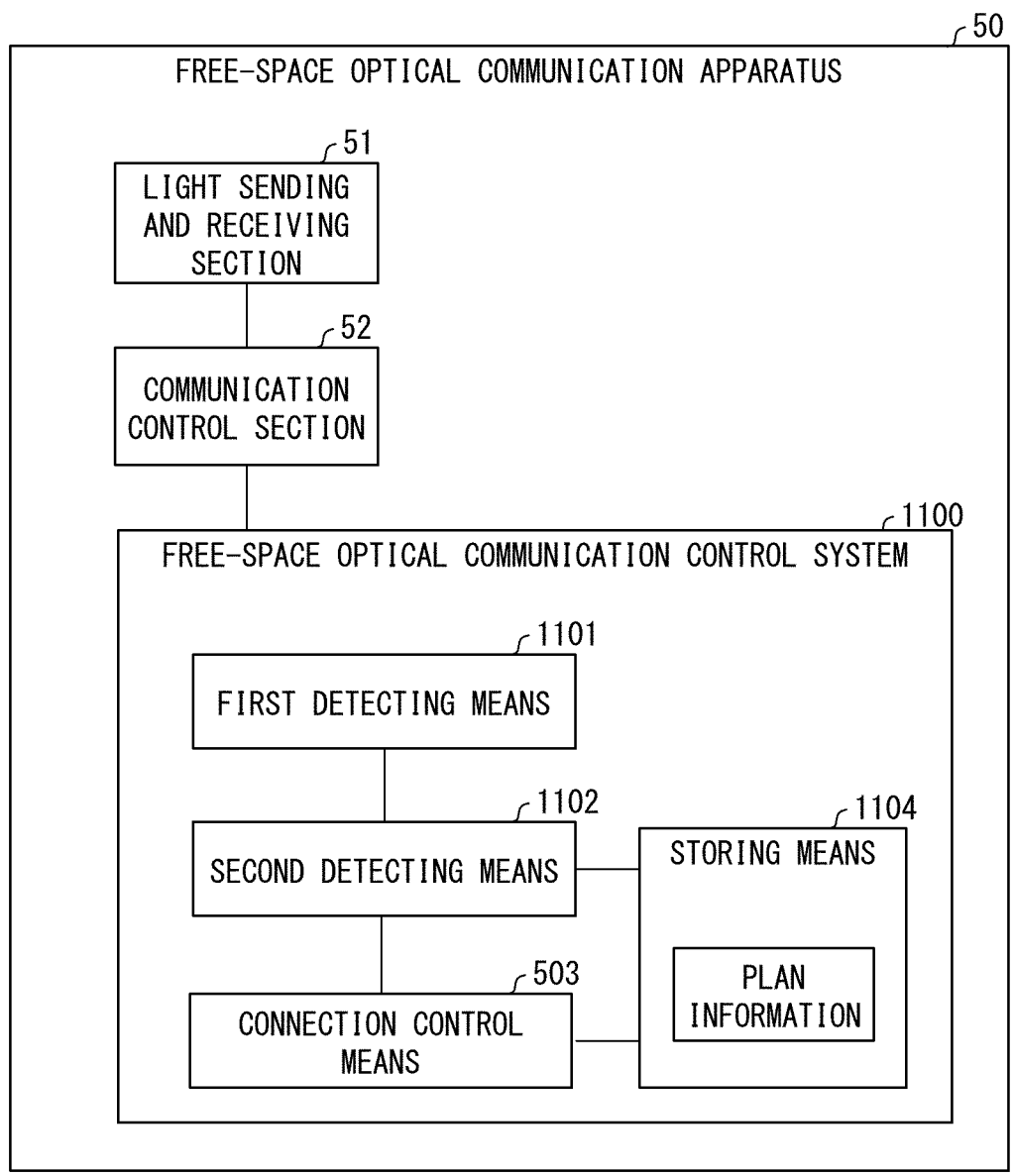
FIG. 11 is a block diagram of an example configuration of a free-space optical communication control system in accordance with a fourth example embodiment.

FIG. 11 is a block diagram of an example configuration of the free-space optical communication control system 1100 in accordance with the fourth example embodiment of the present invention. In FIG. 11, each of the blocks indicates a function-by-function component. Accordingly, the blocks illustrated in FIG. 11 may be implemented in a single apparatus, or may be implemented in more than one apparatus. Further, some or all of the blocks may be implemented as functions with use of the cloud or the like. As illustrated in FIG. 11, the free-space optical communication control system 1100 includes a first detecting means 1101, a second detecting means 1102, a connection control means 903, and a storing means 1104. An example of the plan information stored in the storing means 1104 is illustrated in FIG. 12. As in the second example embodiment, the free-space optical communication control system 1100 is included in a free-space optical communication apparatus 50, and this free-space optical communication apparatus 50 is the "first free-space optical communication apparatus", which is to be controlled by the free-space optical communication control system 1100.

In accordance with the optical axis alignment between the free-space optical communication apparatus 50 that is the first free-space optical communication apparatus and the free-space optical communication apparatus 50 (second free-space optical communication apparatus) adjacent to the free-space optical communication apparatus 50 that is the first free-space optical communication apparatus, the first detecting means 1101 detects a change in a position of the adjacent free-space optical communication apparatus 50 (second free-space optical communication apparatus) relative to a position of the free-space optical communication apparatus 50 that is the first free-space optical communication apparatus.

Figure 13:
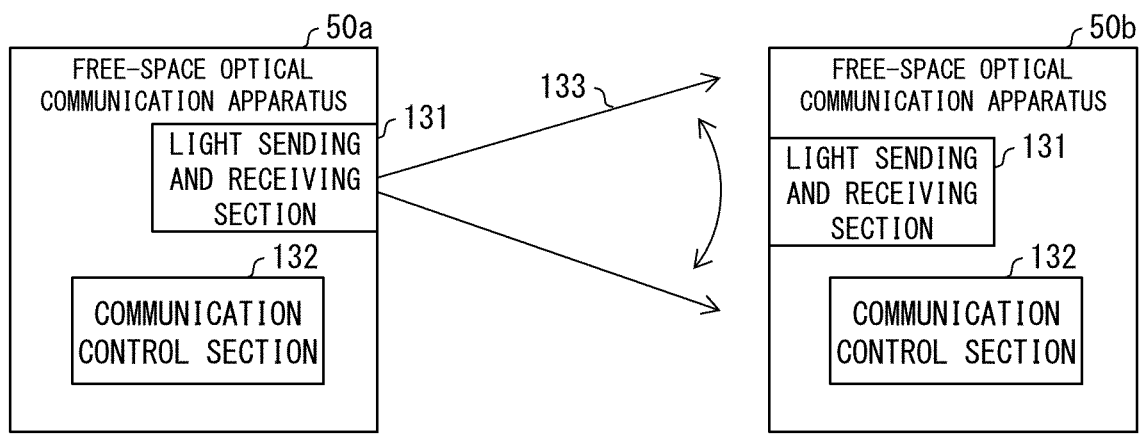
FIG. 13 is an explanatory diagram of an example of optical axis alignment carried out by free-space optical communication apparatuses.

In order to carry out free-space optical communication between the free-space optical communication apparatuses 50, optical axis alignment between the free-space optical communication apparatuses 50 needs to have been carried out. FIG. 13 is an explanatory diagram of an example of optical axis alignment carried out by the free-space optical communication apparatuses 50. In the following description, for example, a process flow in which the free-space optical communication apparatus 50a carries out scanning to carry out optical axis alignment with the free-space optical communication apparatus 50b will be described. The optical axis alignment between any free-space optical communication apparatuses can also be carried out in the same manner.

As illustrated in FIG. 13, the free-space optical communication apparatuses 50a and 50b include a light sending and receiving section 131 and a communication control section 132.

The light sending and receiving section 131 sends and receives light used in free-space optical communication. For example, the light sending and receiving section 131 of the free-space optical communication apparatus 50a directs light toward a predetermined angle range to send the light, and the light sending and receiving section 131 of the free-space optical communication apparatus 50b receives the light. Thus, free-space optical communication can be carried out. The specific configuration of the light sending and receiving section 131 for directing light is not limited thereto. For example, the light transmitting and receiving section 131 can have a configuration so as to include:

a beamforming antenna that directs a millimeter wave or submillimeter wave toward a predetermined angle range;

a collimator that collimates infrared, visible, or ultraviolet light;

a laser oscillator that produces laser light of infrared light, visible, or ultraviolet light; and a modulator that modulates laser light by changing the phase of a liquid crystal; etc.

The communication control section 132 controls the light sending and receiving section 131 to carry out optical axis alignment. In order to align the optical axes, the communication control section 132 sends scan light 133 to the light sending and receiving section 131 at different directions (scan with use of the scan light 133). Then, the scan light 133 sent from the light sending and receiving section 131 of the free-space optical communication apparatus 50*a* in a correct direction is received by the light sending and receiving section 131 of the free-space optical communication apparatus 50*b*.

The scan with use of the scan light 133 refers to, for example, a search carried out for identifying the position of the free-space optical communication apparatus 50*b*. The word scan is not intended to define a specific scanning order, etc. The scan light 133 contains identification information that identifies the free-space optical communication apparatus 50*a* and direction information (azimuth angle, elevation angle, and depression angle) that indicates the direction in which the light is sent out.

When the light sending and receiving section 131 of the free-space optical communication apparatus 50*b* successfully receives the scan light 133, that is, the optical axes of the light sending and receiving sections 131 coincide with each other, the communication control section 132 of the free-space optical communication apparatus 50*b* acquires the identification information and the direction information that are contained in the scan light 133 and identifies the direction of the free-space optical communication apparatus 50*a*. The communication control section 132 of the free-space optical communication apparatus 50*b* identifies the distance to the free-space optical communication apparatus 50*a* in accordance with the attenuation of the scan light 133. This enables the communication control section 132 of the free-space optical communication apparatus 50*b* to identify the relative position of the free-space optical communication apparatus 50*a*.

Figure 14:
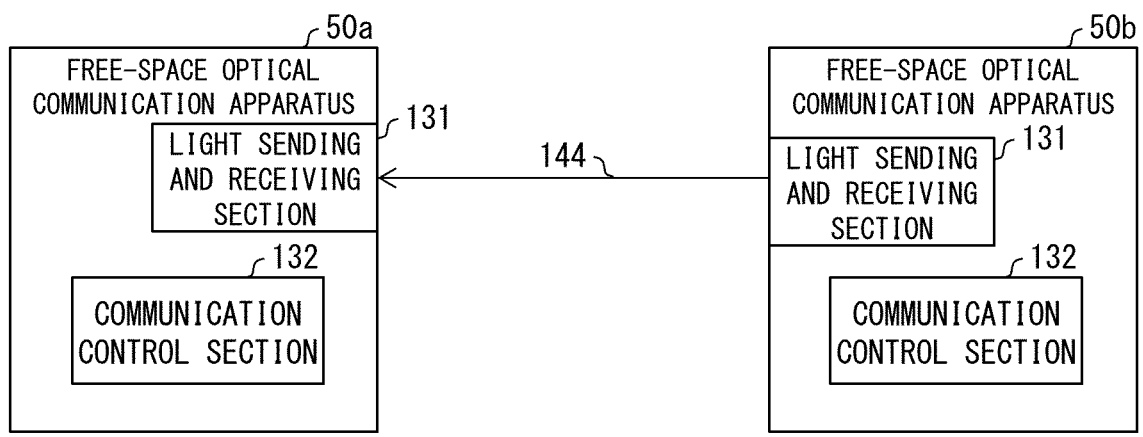
FIG. 14 is an explanatory diagram of an example of the optical axis alignment carried out by free-space optical communication apparatuses.

As illustrated in FIG. 14, the communication control section 132 of the free-space optical communication apparatus 50*b* causes the light sending and receiving section 131 to send response light 144 toward the light sending and receiving section 131 of the free-space optical communication apparatus 50*a*. The response light 144 contains identification information that identifies the free-space optical communication apparatus 50*b*; direction information acquired from the scan light 133; and distance information that indicates the distance to the free-space optical communication apparatus 50*a* identified by the communication control section 132 of the free-space optical communication apparatus 50*b*. When the light sending and receiving section 131 of the free-space optical communication apparatus 50*a* receives the response light 144, the communication control section 132 of the free-space optical communication apparatus 50*b* can acquire the identification information, the direction information, and the distance information contained in the scan light 133, identify the direction of the free-space optical communication apparatus 50*b* and the distance to the free-space optical communication apparatus 50*b*, and identify the relative position of the free-space optical communication apparatus 50*b*. Thus, the optical axis alignment is completed.

As described above, the position information regarding each of the free-space optical communication apparatuses 50 can be identified in accordance with the optical axis alignment between the free-space optical communication apparatuses 50, so that the first detecting means 1101 can detect a change in the position of the adjacent free-space optical communication apparatus 50 (second free-space optical communication apparatus).

It is also possible to acquire the absolute position information regarding each free-space optical communication apparatus by the following mechanism. For example, in a case where a fixed free-space optical communication apparatus (hereinafter referred to as a free-space optical communication apparatus A) possesses the absolute position information regarding the free-space optical communication apparatus A, such as, for example, information that indicates a latitude and a longitude or information that indicates coordinates on a map corresponding to a communication area of the free-space optical communication network, the free-space optical communication apparatus A can estimate the absolute position information regarding the surrounding free-space optical communication apparatuses, from the relative position information on the positions of the surrounding free-space optical communication apparatuses relative to the free-space optical communication apparatus A, the relative position information being acquired by optical axis alignment, and the absolute position information on the absolute position of the free-space optical communication apparatus A.

Since the free-space optical communication apparatus A shares the absolute position information that is possessed by the free-space optical communication apparatus A and that is regarding the free-space optical communication apparatus A, with another free-space optical communication apparatus, the free-space optical communication apparatus other than the free-space optical communication apparatus A can also estimate the absolute position information regarding each free-space optical communication apparatus. This makes it possible to understand the absolute position of each free-space optical communication apparatus at any timing. It is thus possible to estimate an interruption of free-space optical communication by comparison with the movement route information.

As illustrated in FIG. 12, the plan information stored in the storing means 1104 further indicates the position of each of the free-space optical communication apparatuses 50 in each of the work stages. The second detecting means 1102 detects a transition of the work stages further in accordance with the change in the position of the adjacent free-space optical communication apparatus 50 (second free-space optical communication apparatus) detected by the first detecting means 1101. Specifically, the second detecting means 1102 detects a transition of the work stages by determining a work stage indicated in the plan information, the connection relationship with each of the free-space optical communication apparatuses 50 of the work stage and the position of each of the free-space optical communication apparatuses 50 of the work stage matching the connection relationship with the adjacent free-space optical communication apparatus 50 (second free-space optical communication apparatus) and the position of the adjacent free-space optical communication apparatus 50 (second free-space optical communication apparatus) that are detected by the first detecting means 1101. This makes it possible to detect a transition of work stages more accurately.

In the above description, the fourth example embodiment as the free-space optical communication control system 1100 has been described. The free-space optical communication control system 1100 in accordance with the fourth example embodiment may be incorporated into a single apparatus to form a free-space optical communication control apparatus. In that case, as described above, the free-space optical communication control apparatus may be included in the free-space optical communication apparatus to be controlled. The free-space optical communication control method in accordance with the fourth example embodiment may be the operation of the free-space optical communication control system 1100 in accordance with the fourth example embodiment. In that case, as described above, an agent that carries out the free-space optical communication control method may be included in the free-space optical communication apparatus to be controlled.

Fifth Example Embodiment

A free-space optical communication control system 1500 in accordance with a fifth example embodiment will be described. The same reference sign is assigned to a component that has the same function as the component described in the first to fourth example embodiments, and the description thereof is omitted.

Figure 15:
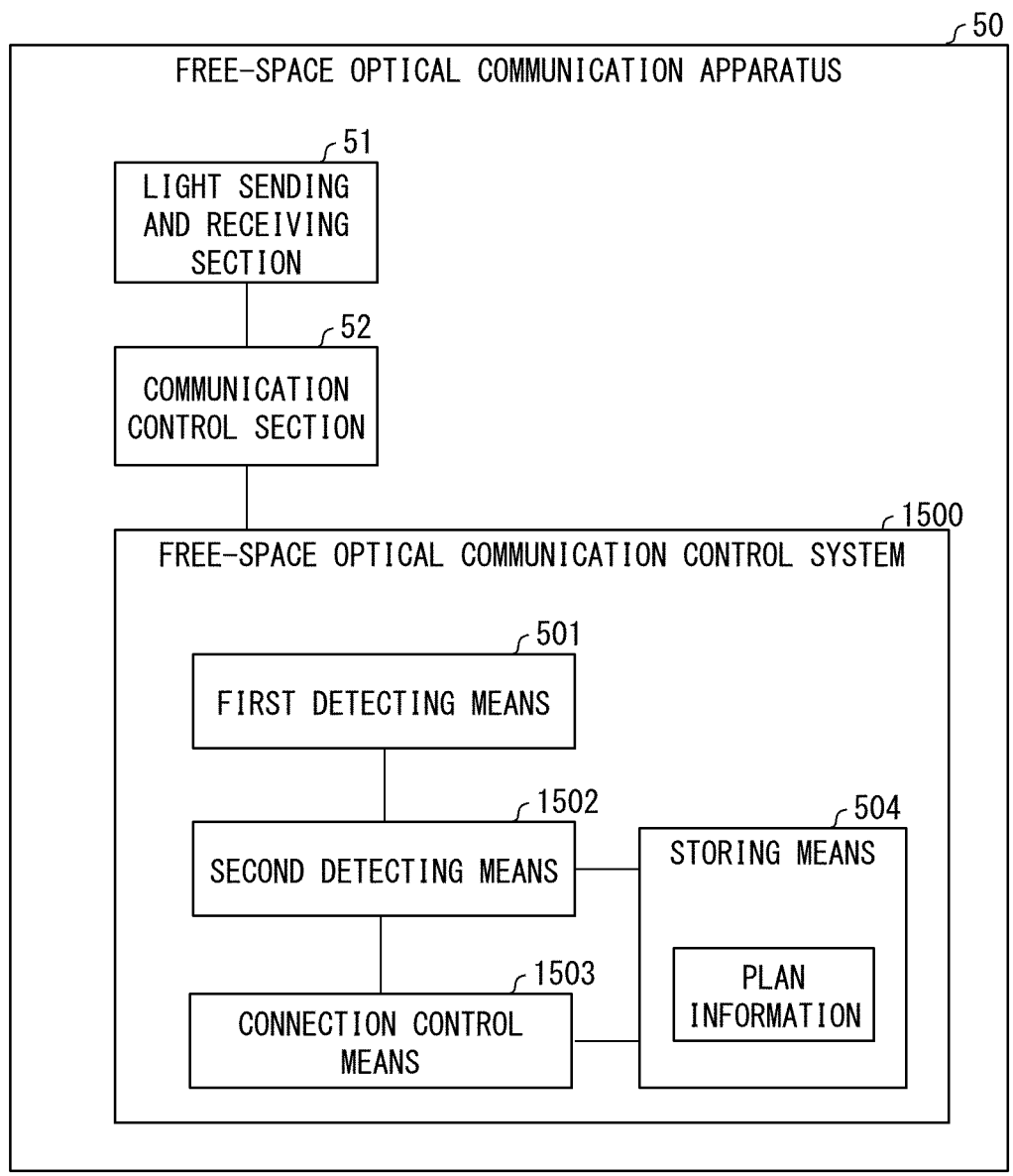
FIG. 15 is a block diagram of an example configuration of a free-space optical communication control system in accordance with a fifth example embodiment.

FIG. 15 is a block diagram of an example configuration of the free-space optical communication control system 1500 in accordance with the fifth example embodiment of the present invention. In FIG. 15, each of the blocks indicates a function-by-function component. Accordingly, the blocks illustrated in FIG. 15 may be implemented in a single apparatus, or may be implemented in more than one apparatus. Further, some or all of the blocks may be implemented as functions with use of the cloud or the like. As illustrated in FIG. 15, the free-space optical communication control system 1500 includes a first detecting means 501, a second detecting means 1502, a connection control means 1503, and a storing means 504. As in the second example embodiment, the free-space optical communication control system 1500 is included in the free-space optical communication apparatus 50 that is the first free-space optical communication apparatus.

In detecting a transition of work stages, the second detecting means 1502 may detect an anomaly in the transition of the work stages. The anomaly in a transition of the work stages means that the connection relationship among the free-space optical communication apparatuses is not similar to the connection relationship in any of the work stages indicated by the plan information. Examples of the cause of the occurrence of the anomaly include a case in which the free-space optical communication apparatus is placed at a position different from the placement position of the intended work stage and a case in which the free-space optical communication apparatus fails. In a case where the connection relationship that has changed and that has been detected by the first detecting means does not match the connection relationship in any of the work stages indicated by the plan information, the second detecting means 1502 may detect an anomaly of the transition of the work stages.

The connection control means 1503 acquires, in response to the anomaly of the transition of the work stages detected by the second detecting means 1502, work stage information possessed by the free-space optical communication apparatus 50 (fourth free-space optical communication apparatus) from the free-space optical communication apparatus 50 (fourth free-space optical communication apparatus) adjacent to the free-space optical communication apparatus 50 that is the first free-space optical communication apparatus, and controls, according to the work stage information, which connection destination is connected to the free-space optical communication apparatus 50 that is the first free-space optical communication apparatus. The fourth free-space optical communication apparatus may be restated as a reference free-space optical communication apparatus.

For example, in a case where the second detecting means 1502 detects an anomaly in the transition of the work stages, the connection control means 1503 acquires work stage information possessed by the free-space optical communication control system 1500 of the adjacent free-space optical communication apparatus 50 (fourth free-space optical communication apparatus). The work stage information may be acquired from an adjacent free-space optical communication apparatus 50 (fourth free-space optical communication apparatus) via, for example, free-space optical communication or another other communication means (e.g., wireless communication means that is not illustrated). The work stage information possessed by the adjacent free-space optical communication apparatus 50 (fourth free-space optical communication apparatus) refers to the work stage after the transition that has been most recently detected by the second detecting means 1502 of the adjacent free-space optical communication apparatus 50 (fourth free-space optical communication apparatus) or to an initial work stage in a case where a transition of the work stages is not detected.

With reference to the plan information, the connection control means 1503 controls which connection destination is connected to the free-space optical communication apparatus 50 that is the first free-space optical communication apparatus, such that the connection relationship indicated by the work stage information acquired from the adjacent free-space optical communication apparatus 50 (fourth free-space optical communication apparatus) is matched.

Figure 16:
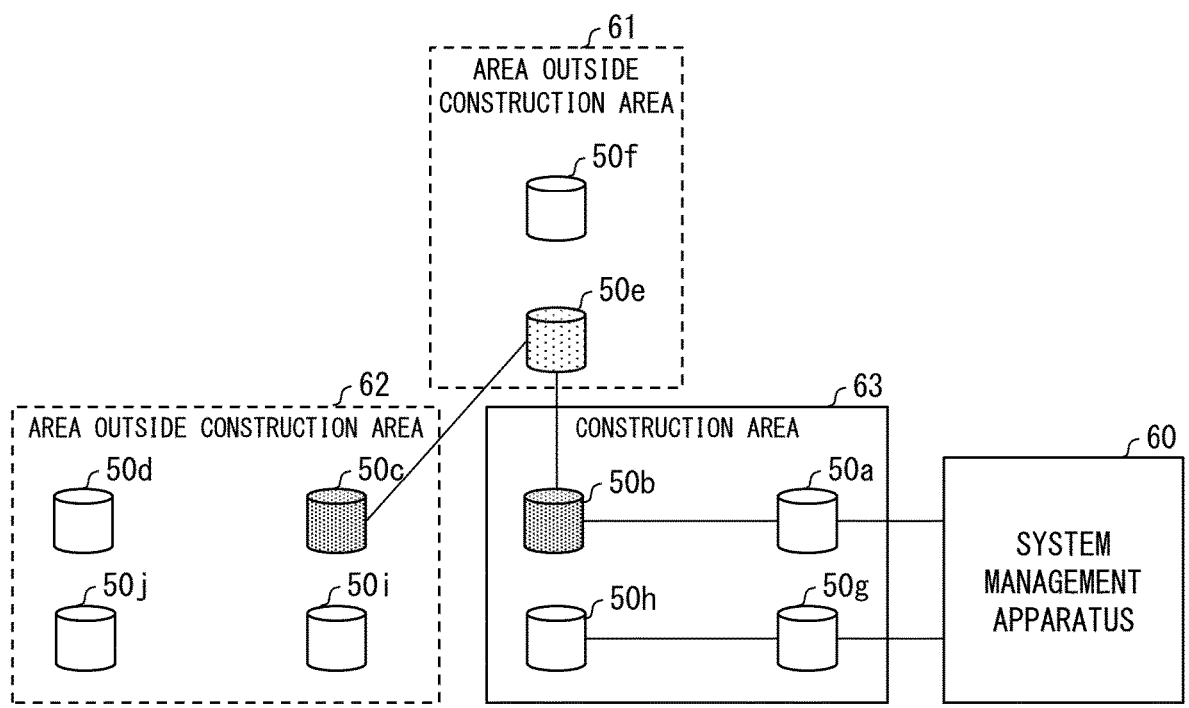
FIG. 16 is a diagram of an example operation, in the fifth example embodiment, carried out when an anomaly is detected.

For example, in the example illustrated in FIG. 16, in the free-space optical communication control system 1500 of the free-space optical communication apparatus 50*e*, the connection relationship (connection to the free-space optical communication apparatuses 50*b* and 50*c*) detected by the first detecting means 501 does not match the connection relationship in any of the work stages indicated by the plan information, and the second detecting means 1502 therefore detects an anomaly in the transition of the work stages. The connection control means 1503 then acquires, from the free-space optical communication apparatus 50*b* or 50*c*, the work stage 2, which is work stage information possessed by the free-space optical communication apparatus 50*b* or 50*c*, and controls which connection destination is connected to the free-space optical communication apparatus 50*e*, such that the connection relationship in the work stage 2 indicated by the plan information is matched. This allows elimination of the anomaly.

In the above description, the fifth example embodiment as the free-space optical communication control system 1500 has been described. The free-space optical communication control system 1500 in accordance with the fifth example embodiment may be incorporated into a single apparatus to form a free-space optical communication control apparatus. In that case, as described above, the free-space optical communication control apparatus may be included in the free-space optical communication apparatus to be controlled. The free-space optical communication control method in accordance with the fifth example embodiment may be the operation of the free-space optical communication control system 1500 in accordance with the fifth example embodiment. In that case, as described above, an agent that carries out the free-space optical communication control method may be included in the first free-space optical communication apparatus.

Application Example

An example described in the second to fifth example embodiments is the example applied to a construction site in which free-space optical communication is used. As described above, each of the example embodiments is not limited thereto, but can be applied to work in general in which a connection relationship among the free-space optical communication apparatuses changes depending on the work stages.

For example, in the case of using free-space optical communication in the inspection of power transmission lines, bridge girders, etc., the inspection can be such that a location under inspection is changed every time the work stage changes. In this case, since the free-space optical communication is carried out in the vicinity of the location under inspection, it is necessary to change the connection relationship among the free-space optical communication apparatuses. Even in such a case, by applying the above-described example embodiments, it is possible to semi-automatically change the connection relationship among the free-space optical communication apparatuses every time the work stage changes.

The present disclosure is not limited to the example embodiments above, but can be altered by a skilled person in the art in various ways. The present disclosure also encompasses, in its technical scope, any example embodiment derived by combining configurations, operations, and processes disclosed in differing example embodiments.

Figure 17:
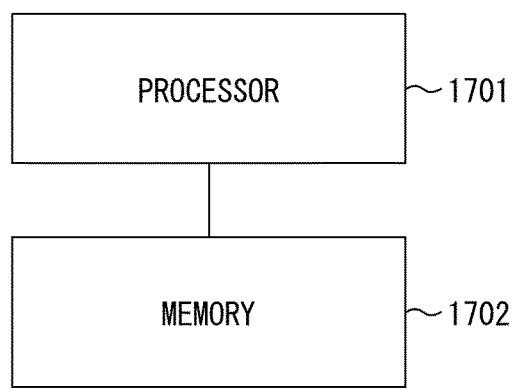
FIG. 17 is a schematic configuration diagram of hardware of a computer in accordance with the example embodiments.

Each of the components in accordance with the first to fifth example embodiments may be configured via a single piece of hardware. Each of the components in accordance with the first to fifth example embodiments may be configured via a single piece of software. Each of the components in accordance with the first to fifth example embodiments may be configured via a plurality of pieces of hardware. Each of the components in accordance with the first to fifth example embodiments may be configured via a plurality of pieces of software. The first to fourth example embodiments may be provided by a combination of hardware and software. Each of the functions in accordance with the first to fifth example embodiments may be implemented with use of the cloud. Each apparatus, each function, and each process may be provided with use of a computer including a processor 1701 and a memory 1702 as illustrated in FIG. 17. For example, a program for carrying out the free-space optical communication control methods described in the first to fifth example embodiments may be stored in the memory 1702, and the processor 1701 may retrieves and executes the program stored in the memory 1702, so that the functions described in the first to fifth example embodiments may be provided.

The program contains a set of instructions for, when the program is loaded into the computer, causing the computer to carry out one or more of the functions described in the first to fifth example embodiments. The program is stored in the memory 1702. Examples of the processor 1701 can encompass a central processing unit (CPU). Examples of the memory 1702 can encompass a read only memory (ROM), a random access memory (RAM), a flash memory, and a solid state drive (SSD).

The present disclosure is not limited to the example embodiments above. That is, the present invention can apply, within the scope of the present disclosure, various example aspects that could be understood by a person skilled in the art. All or some of the example embodiments above can also be described as below. Note, however, that the present invention is not limited to the following example aspects.

[Supplementary Note 1]

A free-space optical communication control system including: a first detecting means for detecting a change in a connection relationship between a first free-space optical communication apparatus and a second free-space optical communication apparatus adjacent to the first free-space optical communication apparatus; a second detecting means for detecting a transition of work stages in accordance with the change in the connection relationship detected and plan information indicating a connection relationship between the first free-space optical communication apparatus and the second free-space optical communication apparatus in each of the work stages; and a connection control means for controlling, according to the transition of the work stages detected, which connection destination is connected to the first free-space optical communication apparatus.

[Supplementary Note 2]

The free-space optical communication control system described in supplementary note 1, further including a notifying means for notifying, of the transition of the work stages detected, a third free-space optical communication apparatus that is not the first free-space optical communication apparatus.

[Supplementary Note 3]

The free-space optical communication control system described in supplementary note 2, in which the notifying means is configured to notify, of the transition of the work stages detected, the third free-space optical communication apparatus that relays communication between the first free-space optical communication apparatus and a management apparatus.

[Supplementary Note 4]

The free-space optical communication control system described in supplementary note 2 or 3, by notifying the third free-space optical communication apparatus of the transition of the work stages detected, the notifying means is configured to cause which connection destination is connected to the third free-space optical communication apparatus to be controlled.

[Supplementary Note 5]

The free-space optical communication control system described in any one of supplementary notes 1 to 4, in which: the first detecting means is configured to further detect a change in a position of the second free-space optical communication apparatus relative to a position of the first free-space optical communication apparatus, in accordance with optical axis alignment between the first free-space optical communication apparatus and the second free-space optical communication apparatus; the plan information further indicates a position of each of free-space optical communication apparatuses in each of the work stages; and the second detecting means is configured to detect the transition of the work stages further in accordance with the change in the position of the second free-space optical communication apparatus detected by the first detecting means.

[Supplementary Note 6]

The free-space optical communication control system described in any one of supplementary notes 1 to 5, in which: the connection control means is configured to acquire, from a fourth free-space optical communication apparatus adjacent to the first free-space optical communication apparatus, work stage information possessed by the fourth free-space optical communication apparatus, in response to an anomaly in the transition of the work stages detected, and control, according to the work stage information, which connection destination is connected to the first free-space optical communication apparatus.

[Supplementary Note 7]

A free-space optical communication control apparatus including: a connection control section for controlling a connection destination of free-space optical communication;

a first detecting section for detecting a change in a connection relationship with an adjacent free-space optical communication apparatus that is the connection destination of the free-space optical communication; and a second detecting section for detecting a transition of work stages in accordance with the change in the connection relationship detected by the first detecting section and with reference to plan information indicating a connection relationship of the free-space optical communication in each of the work stages, the connection control section controlling, according to the transition of the work stages detected by the second detecting section, which connection destination is connected to the free-space optical communication.

[Supplementary Note 8]

The free-space optical communication control apparatus described in supplementary note 7, further including a notifying section for notifying a notification destination free-space optical communication apparatus of the transition of the work stages detected.

[Supplementary Note 9]

The free-space optical communication control apparatus described in supplementary note 8, in which the notifying section is configured to notify, of the transition of the work stages detected, the notification destination free-space optical communication apparatus that relays communication with a management apparatus.

[Supplementary Note 10]

The free-space optical communication control apparatus described in supplementary note 8 or 9, by notifying the notification destination free-space optical communication apparatus of the transition of the work stages detected, the connection control section is configured to cause which connection destination is connected to the notification destination free-space optical communication apparatus to be controlled.

[Supplementary Note 11]

The free-space optical communication control apparatus described in any one of supplementary notes 7 to 10, in which the first detecting section is configured to further detect a change in a position of the adjacent free-space optical communication control apparatus in accordance with optical axis alignment with the adjacent free-space optical communication control apparatus, the plan information further indicates a position of each of free-space optical communication apparatuses in each of the work stages; and the second detecting section is configured to detect the transition of the work stages further in accordance with the change in the position of the adjacent free-space optical communication apparatus detected by the first detecting section.

[Supplementary Note 12]

The free-space optical communication control apparatus described in any one of supplementary notes 7 to 11, in which the connection control section is configured to acquire, from a reference free-space optical communication apparatus, work stage information possessed by the reference free-space optical communication apparatus, in response to an anomaly in the transition of the work stages detected, and control, according to the work stage information, which connection destination is connected to the free-space optical communication.

[Supplementary Note 13]

A free-space optical communication control method including: detecting a change in a connection relationship between a first free-space optical communication apparatus and a second free-space optical communication apparatus adjacent to the first free-space optical communication apparatus; detecting a transition of work stages in accordance with the change in the connection relationship detected and plan information indicating a connection relationship between free-space optical communication apparatuses in each of the work stages; and controlling, according to the transition of the work stages detected, which connection destination is connected to the first free-space optical communication apparatus.

[Supplementary Note 14]

The free-space optical communication control method according to supplementary note 13, further including notifying, of the transition of the work stages detected, a third free-space optical communication apparatus that is not the first free-space optical communication apparatus.

[Supplementary Note 15]

The free-space optical communication control method according to supplementary note 14, in which the third free-space optical communication apparatus that relays communication between the first free-space optical communication apparatus and a management apparatus is notified of the transition of the work stages detected.

[Supplementary Note 16]

The free-space optical communication control method described in supplementary note 14 or 15, in which by notifying the third free-space optical communication apparatus of the transition of the work stages detected, which connection destination is connected to the third free-space optical communication apparatus is caused to be controlled.

[Supplementary Note 17]

The free-space optical communication control method described in any one of supplementary notes 13 to 16, in which: a change in a position of the second free-space optical communication apparatus relative to a position of the first free-space optical communication apparatus is further detected in accordance with optical axis alignment between the first free-space optical communication apparatus and the second free-space optical communication apparatus; the plan information further indicates a position of each of free-space optical communication apparatuses in each of the work stages; and the transition of the work stages is detected further in accordance with the change in the position of the second free-space optical communication apparatus detected.

[Supplementary Note 18]

The free-space optical communication control method described in any one of supplementary notes 13 to 17, in which work stage information possessed by a fourth free-space optical communication apparatus adjacent to the first free-space optical communication apparatus is acquired from the fourth free-space optical communication apparatus in response to an anomaly in the transition of the work stages detected, and which connection destination is connected to the first free-space optical communication apparatus is controlled according to the work stage information.

REFERENCE SIGNS LIST 10, 50: Free-space optical communication apparatus
60: System management apparatus
61, 62, 63: Area
100, 500, 900, 1100, 1500: Free-space optical communication control system
101, 501, 1101: First detecting means
102, 502, 1102, 1502: Second detecting means
103, 503, 903, 1503: Connection control means
131: Light sending and receiving section
132: Optical axis aligning section
133: Scan light 144: Response light
400: Free-space optical communication control apparatus
401: First detecting means
402: Second detecting means
403: Connection control means
504, 1104: Storing means
905: Notifying means
1701: Processor
1702: Memory

The invention claimed is:

1. A free-space optical communication control system comprising
at least one processor,
the at least one processor carrying out:
a first detection process of detecting a change in a connection relationship between a first free-space optical communication apparatus and a second free-space optical communication apparatus adjacent to the first free-space optical communication apparatus;
a second detection process of detecting a transition of work stages in accordance with the change in the connection relationship detected and plan information indicating a connection relationship between the first free-space optical communication apparatus and the second free-space optical communication apparatus in each of the work stages; and
a connection control process of controlling, according to the transition of the work stages detected, which connection destination is connected to the first free-space optical communication apparatus.

2. The free-space optical communication control system according to claim 1, wherein
the at least one processor further carries out
a notification process of notifying, of the transition of the work stages detected, a third free-space optical communication apparatus that is not the first free-space optical communication apparatus.

3. The free-space optical communication control system according to claim 2, wherein
in the notification process, the at least one processor notifies, of the transition of the work stages detected, the third free-space optical communication apparatus that relays communication between the first free-space optical communication apparatus and a management apparatus.

4. The free-space optical communication control system according to claim 2, wherein
by notifying, in the notification process, the third free-space optical communication apparatus of the transition of the work stages detected, the at least one processor causes which connection destination is connected to the third free-space optical communication apparatus to be controlled.

5. The free-space optical communication control system according to claim 1, wherein:
in the first detection process, the at least one processor further detects a change in a position of the second free-space optical communication apparatus relative to a position of the first free-space optical communication apparatus, in accordance with optical axis alignment between the first free-space optical communication apparatus and the second free-space optical communication apparatus;
the plan information further indicates a position of each of free-space optical communication apparatuses in each of the work stages; and in the second detection process, the at least one processor detects the transition of the work stages, further in accordance with the change in the position of the second free-space optical communication apparatus detected in the first detection process.

6. The free-space optical communication control system according to claim 1, wherein
in the connection control process, the at least one processor acquires, from a fourth free-space optical communication apparatus adjacent to the first free-space optical communication apparatus, work stage information possessed by the fourth free-space optical communication apparatus, in response to an anomaly in the transition of the work stages detected, and controls, according to the work stage information, which connection destination is connected to the first free-space optical communication apparatus.

7. A free-space optical communication control apparatus comprising at least one processor,
the at least one processor carrying out:
a connection control process of controlling which connection destination is connected to free-space optical communication;
a first detection process of detecting a change in a connection relationship with an adjacent free-space optical communication apparatus that is a connection destination of the free-space optical communication; and
a second detection process of detecting a transition of work stages in accordance with the change in the connection relationship detected in the first detection process and with reference to plan information indicating a connection relationship of the free-space optical communication in each of the work stages,
in the connection control process, the at least one processor controlling, according to the transition of the work stages detected in the second detection process, which connection destination is connected to the free-space optical communication.

8. The free-space optical communication control apparatus according to claim 7, wherein
the at least one processor further carries out a notification process of notifying, of the transition of the work stages detected, a third free-space optical communication apparatus that is not the first free-space optical communication apparatus.

9. The free-space optical communication control apparatus according to claim 8, wherein
in the notification process, the at least one processor notifies, of the transition of the work stages detected, the third free-space optical communication apparatus that relays communication between the first free-space optical communication apparatus and a management apparatus.

10. The free-space optical communication control apparatus according to claim 8, wherein
by notifying, in the notification process, the third free-space optical communication apparatus of the transition of the work stages detected, the at least one processor causes which connection destination is connected to the third free-space optical communication apparatus to be controlled.

11. The free-space optical communication control apparatus according to claim 7, wherein:
in the first detection process, the at least one processor further detects a change in a position of the second free-space optical communication apparatus relative to a position of the first free-space optical communication apparatus, in accordance with optical axis alignment between the first free-space optical communication apparatus and the second free-space optical communication apparatus;

the plan information further indicates a position of each of free-space optical communication apparatuses in each of the work stages; and in the second detection process, the at least one processor detects the transition of the work stages, further in accordance with the change in the position of the second free-space optical communication apparatus detected in the first detection process.

12. The free-space optical communication control apparatus according to claim 7, wherein in the connection control process, the at least one processor acquires, from a free-space optical communication apparatus that is the connection destination of the free-space optical communication, work stage information possessed by the free-space optical communication apparatus, in response to an anomaly in the transition of the work stages detected, and controls, according to the work stage information, which connection destination is connected to the free-space optical communication.

13. A free-space optical communication control method comprising:

detecting a change in a connection relationship between a first free-space optical communication apparatus and a second free-space optical communication apparatus adjacent to the first free-space optical communication apparatus;

detecting a transition of work stages in accordance with the change in the connection relationship detected and plan information indicating a connection relationship between free-space optical communication apparatuses in each of the work stages; and controlling, according to the transition of the work stages detected, which connection destination is connected to the first free-space optical communication apparatus.

14. The free-space optical communication control method according to claim 13, further comprising notifying, of the transition of the work stages detected, a third free-space optical communication apparatus that is not the first free-space optical communication apparatus.

15. The free-space optical communication control method according to claim 14, wherein the third free-space optical communication apparatus that relays communication between the first free-space optical communication apparatus and a management apparatus is notified of the transition of the work stages detected.

16. The free-space optical communication control method according to claim 14, wherein by notifying the third free-space optical communication apparatus of the transition of the work stages detected, which connection destination is connected to the third free-space optical communication apparatus is caused to be controlled.

17. The free-space optical communication control method according to claim 13, wherein:

a change in a position of the second free-space optical communication apparatus relative to a position of the first free-space optical communication apparatus is further detected in accordance with optical axis alignment between the first free-space optical communication apparatus and the second free-space optical communication apparatus;

the plan information further indicates a position of each of free-space optical communication apparatuses in each of the work stages; and the transition of the work stages is detected further in accordance with the change in the position of the second free-space optical communication apparatus detected.

18. The free-space optical communication control method according to claim 13, wherein work stage information possessed by a fourth free-space optical communication apparatus adjacent to the first free-space optical communication apparatus is acquired from the fourth free-space optical communication apparatus in response to an anomaly in the transition of the work stages detected, and which connection destination is connected to the first free-space optical communication apparatus is controlled according to the work stage information.

* * * * *